(12) United States Patent
Jones

(10) Patent No.: US 7,609,757 B2
(45) Date of Patent: *Oct. 27, 2009

(54) DSL RATE ADAPTATION

(75) Inventor: David Jones, Louisville, CO (US)

(73) Assignee: Broadcom Corporation, Irvine, CA (US)

( * ) Notice: Subject to any disclaimer, the term of this patent is extended or adjusted under 35 U.S.C. 154(b) by 567 days.

This patent is subject to a terminal disclaimer.

(21) Appl. No.: 11/080,100

(22) Filed: Mar. 15, 2005

(65) Prior Publication Data

US 2005/0157804 A1 Jul. 21, 2005

Related U.S. Application Data

(63) Continuation of application No. 09/819,864, filed on Mar. 28, 2001, now Pat. No. 6,904,082, which is a continuation of application No. 09/309,340, filed on May 11, 1999, now Pat. No. 6,310,909.

(60) Provisional application No. 60/113,617, filed on Dec. 23, 1998.

(51) Int. Cl.
    H04B 1/38 (2006.01)
    H04L 5/12 (2006.01)
(52) U.S. Cl. .................... 375/220; 375/261
(58) Field of Classification Search ........... 375/219, 375/220, 222, 223, 259, 260, 261, 265, 285, 375/298; 370/252, 468; 329/304; 332/103
    See application file for complete search history.

(56) References Cited

U.S. PATENT DOCUMENTS

| 5,359,593 | A | 10/1994 | Derby et al. |
|---|---|---|---|
| 5,479,447 | A | 12/1995 | Chow et al. |
| 5,598,435 | A | 1/1997 | Williams |
| 5,774,500 | A * | 6/1998 | Zogakis et al. ............ 375/261 |
| 5,987,069 | A | 11/1999 | Furukawa et al. |
| 6,072,779 | A | 6/2000 | Tzannes et al. |
| 6,088,387 | A | 7/2000 | Gelblum et al. |
| 6,101,223 | A | 8/2000 | Betts |
| 6,175,550 | B1 | 1/2001 | Van Nee |
| 6,310,909 | B1 | 10/2001 | Jones |
| 6,327,311 | B1 | 12/2001 | Ojard |
| 6,512,797 | B1 * | 1/2003 | Tellado et al. ............ 375/261 |
| 6,904,082 | B2 | 6/2005 | Jones |

FOREIGN PATENT DOCUMENTS

| EP | 0 753 947 A1 | 1/1997 |
|---|---|---|
| EP | 0 812 087 A2 | 12/1997 |
| EP | 0 869 647 A2 | 10/1998 |
| GB | 2 285 375 A | 7/1995 |
| WO | WO 95/28773 | 10/1995 |
| WO | WO 97/37454 | 10/1997 |
| WO | WO 98/57472 | 12/1998 |

* cited by examiner

Primary Examiner—Don N Vo
(74) Attorney, Agent, or Firm—Sterne, Kessler, Goldstein & Fox P.L.L.C.

(57) ABSTRACT

A method for enhancing the bit rate and/or margin at which quadrature amplitude modulation (QAM) communication is performed includes the steps of varying a spectral allocation and constellation size with which communication is performed, so as to define a combination of spectral allocation and constellation size at which the bit rate and/or margin are enhanced. The spectral allocation can be varied by varying a stop frequency thereof, while maintaining a substantially constant start frequency, so as to mitigate undesirable high frequency content of the bandwidth. Alternatively, both start and stop frequencies may be varied.

33 Claims, 21 Drawing Sheets

FIG.5

| SYMBOL RATE (BANDWIDTH) | SNR (MEASURED) | POTENTIAL CONSTELLATION (ASSUMING 3 dB SNR MARGIN AND OVERALL TARGET RATE=25.92 Mbps) | POTENTIAL BIT RATE |
|---|---|---|---|
| $S_1$ =1.62 Mbaud (DEFAULT) | 40 dB | 256 | 12.96 Mbps |
| $S_2$=3.24 Mbaud | 38 dB | ~~256~~(1)    128 | ~~25.92~~(1) 22.68 Mbps |
| $S_3$=3.70286 Mbaud | 34 dB | ~~128~~(2)    64 | ~~25.92~~(2) 22.21716 Mbps |
| $S_4$=4.05 Mbaud | 31 dB | 128 | 25.92(3) |
| $S_5$=4.32 Mbaud | 28 dB | 64 | 25.92 |
| $S_6$=4.86 Mbaud | 27 dB | 32 | 24.3 |
| $S_7$=5.184 Mbaud | 26 dB | 32 | 25.92(4) |
| $S_8$=5.67 Mbaud | 22 dB | 16 | 22.68 |
| $S_9$=6.48 Mbaud | 16 dB | 4 | 12.96 |

NOTE: FEC PAYLOAD PERCENTAGE=1(NO FEC)

(1) BER TEST FAILED.

(2) QAM-128 INITIALLY SELECTED INSTEAD OF QAM-256 DUE TO VALUE OF OVERALL TARGET RATE. BER TEST AT QAM-128 SUBSEQUENTLY FAILED.

(3) POTENTIAL BIT RATE > TARGET RATE; TARGET RATE ENTERED IN TABLE, AND FEC PAYLOAD PERCENTAGE OPTIONALLY REDUCED.

(4) $S_7$ ULTIMATELY USED FOR COMMUNICATION.

FIG.13

| RECEIVED VOC COMMAND | ECHO OPCODE | ECHO DATA |
|---|---|---|
| D_NOM (0X34) | D_NOM (0X34) | SAME AS COMMAND DATA |
| D_CONST (0x28) | D_CONST (0x28) | SAME AS COMMAND DATA |
| U_CONST (0x98) | U_CONST (0x98) | SAME AS COMMAND DATA |
| SNRREQ (0x01) | SNRREQ (0x01) | DOWNSTREAM AVG. SNR |
| CORERREQ (0x05) | CORERREQ (0x05) | NUMBER OF REED-SOLOMON CORRECTED ERRORS |
| UCERRREQ (0x07) | UCERRREQ (0x07) | NUMBER OF UNCORRECTABLE REED SOLOMON BLOCKS |
| ELSE | UTC (0xF0) | SAME AS COMMAND DATA |

FIG. 15

| PARAMETER | VALID VALUES |
|---|---|
| UPSTREAM SYMBOL RATE | ANY INTEGER VALUE BETWEEN 405E3 BAUD AND 810E3 BAUD |
| UPSTREAM CONSTELLATION | 4,8,16,32,64,128,256 |
| UPSTREAM INTERLEAVING DEPTH | ANY INTEGER BETWEEN 1 AND 16 (UP TO 29 FOR REDUCED CODEWORD SIZES) |
| UPSTREAM TRANSMIT PSD LEVEL | ANY INTEGER BETWEEN 0 AND 63 (PSD[dBm/Hz]=VALUE-100) |
| UPSTREAM CENTER FREQUENCY | RANGE DEPENDS ON SYMBOL RATE, GRANULARITY=1Hz |
| UPSTREAM FRAME STRUCTURE | INCLUDES SYNC WORD, UNCODED CONTROL, CODED CONTROL AND REED SOLOMON CODE WORD, ALL OF PROGRAMMABLE SIZE |
| u_nom | 0x0003 |
| DOWNSTREAM SYMBOL RATE | ANY INTEGER VALUE BETWEEN 1.62E6 BAUD AND 12.96E6 BAUD |
| DOWNSTREAM CONSTELLATION | 4,8,16,32,64,128,256 |
| DOWNSTREAM INTERLEAVING DEPTH | ANY INTEGER BETWEEN 1 AND 16 (UP TO 29 FOR REDUCED CODEWORD SIZES) |
| DOWNSTREAM TRANSMIT PSD LEVEL | ANY INTEGER BETWEEN 0 AND 63 (PSD[dBm/Hz]=VALUE-100) |
| DOWNSTREAM CENTER FREQUENCY | RANGE DEPENDS ON SYMBOL RATE, GRANULARITY=1Hz |
| DOWNSTREAM FRAME STRUCTURE | INCLUDES SYNC WORD, UNCODED CONTROL, CODED CONTROL AND REED SOLOMON CODE WORD, ALL OF PROGRAMMABLE SIZE |
| d_nom | 0x0000 THROUGH 0x000C AND 0x0081 THROUGH 0x0083 |

FIG. 16

| u_nom VALUE | UPSTREAM CHANNEL SYMBOL RATE | UPSTREAM CHANNEL CENTER FREQ. |
|---|---|---|
| 0x0000 | NOT A NOMINAL VALUE | NOT A NOMINAL VALUE |
| 0x0003 | 0.540 MBAUD | 0.650 MHz |

FIG.17

| d_nom VALUE | DOWNSTREAM CHANNEL SYMBOL RATE | DOWNSTREAM CHANNEL CENTER FREQ. |
|---|---|---|
| 0x0000 | NOT A NOMINAL VALUE | NOT A NOMINAL VALUE |
| 0x0001 | 1.620 MBAUD | 3.420 MHz |
| 0x0002 | 1.620 MBAUD | 2.960 MHz |
| 0x0003 | 3.240 MBAUD | 3.950 MHz |
| 0x0004 | 3.240 MBAUD | 3.4425 MHz |
| 0x0005 | 4.860 MBAUD | 4.940 MHz |
| 0x0006 | 4.860 MBAUD | 4.4145 MHz |
| 0x0007 | 6.480 MBAUD | 5.920 MHz |
| 0x0008 | 6.480 MBAUD | 5.3865 MHz |
| 0x0009 | 9.720 MBAUD | 8.240 MHz |
| 0x000A | 9.720 MBAUD | 7.331 MHz |
| 0x000B | 12.960 MBAUD | 10.180 MHz |
| 0x000C | 12.960 MBAUD | 9.275 MHz |
| 0x0081 | 1.620 MBAUD | 2.4705 MHz |
| 0x0082 | 3.70286 MBAUD | 3.720216 MHz |
| 0x0083 | 4.05 MBAUD | 3.9285 MHz |
| 0x0084 | 5.67 MBAUD | 4.9005 MHz |
| 0x0085 | 4.32 MBAUD | 4.0905 MHz |
| 0x0086 | 5.184 MBAUD | 4.6089 MHz |

FIG.20

| AVERAGE UPSTREAM SNR–UPSTREAM MARGIN | UPSTREAM CONSTELLATION VALUE |
|---|---|
| LESS THAN 19 dB | (QAM-4) |
| BETWEEN 19 dB AND 22 dB | (QAM-16) |
| BETWEEN 22 dB AND 25 dB | (QAM-32) |
| BETWEEN 25 dB AND 28 dB | (QAM-64) |
| BETWEEN 28 dB AND 31 dB | (QAM-128) |
| GREATER THAN 31 dB | (QAM-256) |

FIG.21

| SNR–DOWNSTREAM MARGIN | CONSTELLATION |
|---|---|
| LESS THAN 10 dB | NONE |
| BETWEEN 10 dB AND 19 dB | (QAM-4) |
| BETWEEN 19 dB AND 22 dB | (QAM-16) |
| BETWEEN 22 dB AND 25 dB | (QAM-32) |
| BETWEEN 25 dB AND 28 dB | (QAM-64) |
| BETWEEN 28 dB AND 31 dB | (QAM-128) |
| GREATER THAN 31 dB | (QAM-256) |

FIG. 23

| MESSAGE NAME | MESSAGE TYPE | OPCODE FIELD | DATA FIELD | DESCRIPTION |
|---|---|---|---|---|
| IDLE | STATUS | 0xFF | 0x00 | EOC TRANSPORT |
| UTC | ECHO | 0xF0 | SAME AS MESSAGED BEING UTC'ED | UNABLE TO COMPLY MESSAGE |

FIG. 24

| MESSAGE NAME | MESSAGE TYPE | OPCODE FIELD | DATA FIELD | DESCRIPTION |
|---|---|---|---|---|
| SNRREQ | COMMAND (READ) AND ECHO | 0x01 | 2 MSB'S=DS CHANNEL #; 9 LSB'S = COMMAND:ALL ZEROS. ECHO: SPECIFIED DS CHANNEL SNR IN dB, LSB WEIGHT=1/8 dB | REQUEST THAT VTU-R SEND SNR DATA IN THE RETURN DATA FIELD |
| THRPUT | COMMAND (WRITE) AND ECHO | 0x03 | CODED TO CONVEY FINAL SELECTED TRANSMISSION PARAMETERS TO VTU-R | INDICATION TO VTU-R THAT RATE ADAPTIVE STARTUP IS COMPLETE. |
| CORERREQ | COMMAND (READ) AND ECHO | 0x05 | COMMAND:ALL ZERO ECHO:EXPECT VTUR'S CORERR DATA AS UNSIGNED INTEGER=# OF ERRORS(SATURATES AT 65,535) | REQUEST THAT VTU-R SEND NUMBER OF ERRORS CORRECTED BY RS IN THE RETURN DATA FIELD SINCE THE LAST CORERREQ |
| UCERREQ | COMMAND (READ) AND ECHO | 0x07 | COMMAND:ALL ZERO ECHO:EXPECT VTU-R'S UCERR DATA AS UNSIGNED INTEGER=# OF ERRORS(SATURATES AT 65,535) | REQUEST THAT VTU-R SEND NUMBER OF UNCORRECTABLE RS BLOCKS IN THE RETURN DATA FIELD SINCE LAST UCERREQ |

FIG.25

| MESSAGE NAME | MESSAGE TYPE | L1/L2 CLASS | OPCODE FIELD | DATA FIELD | DESCRIPTION |
|---|---|---|---|---|---|
| D_CONST | COMMAND (WRITE) AND ECHO | L1 | 0x28 | 2 MSB'S=DS CHANNEL #; 6 LSB'S = LOG2 (CONSTEL. SIZE) | REQUEST THAT SPECIFIED DS CHAN.# CONSTEL. BE CHANGED |
| D_NOM | COMMAND (WRITE) AND ECHO | L1 | 0x34 | INDICATES WHICH NOMINAL DS SYMBOL RATE AND CENTER FREQ. SET TO USE | SELECT NOMINAL DS SYMBOL RATE AND CENTER FREQUENCY INDICATED IN DATA FIELD |
| U_CONST | COMMAND (WRITE) AND ECHO | L1 | 0x98 | 2 MSB'S=US CHANNEL#; 6 LSB'S=LOG2 (CONSTEL.SIZE) | REQUEST THAT SPECIFIED US CHAN.# CONSTEL. BE CHANGED |
| U_NOM | COMMAND (WRITE) AND ECHO | L1 | 0xA4 | INDICATES WHICH NOMINAL US SYMBOL RATE AND CENTER FREQ. SET TO USE | SELECT NOMINAL US SYMBOL RATE AND CENTER FREQUENCY INDICATED IN DATA FIELD |

DSL RATE ADAPTATION

RELATED APPLICATIONS

This patent application is a continuation of U.S. patent application Ser. No. 09/819,864, filed Mar. 28, 2001, now U.S. Pat. No. 6,904,082, which is a continuation of U.S. patent application Ser. No. 09/309,340, filed May 11, 1999, now U.S. Pat. No. 6,310,909, which claims the benefit of U.S. Provisional Patent Application Ser. No. 60/113,617, filed Dec. 23, 1998 and entitled DSL RATE ADAPTATION, the contents of which are hereby incorporated by reference.

FIELD OF THE INVENTION

The present invention relates generally to electronic communications systems. The present invention relates more particularly to an apparatus and method for providing digital communications via twisted pair telephone lines in digital subscriber line (DSL) systems.

BACKGROUND OF THE INVENTION

Voiceband modems for providing digital communications between computers via twisted pair telephone lines are well known. Voiceband modems are commonly used to provide Internet access by facilitating digital communications between personal computers and Internet Service Providers (ISPs).

Because voiceband modems operate within the limited bandwidth of the Public Switched Telephone Network (PSTN), i.e., 0 Hz to 3,400 Hz they are only capable of providing data rates up to 56 kbps.

However, due to the increasingly large quantity of digital data being communication via twisted pair telephone lines, the maximum bit rate associated with voiceband modems is frequently considered inadequate. The comparatively slow speed of voiceband modems is a severe limitation when transferring large binary files such as images, film clips, audio, large data files and the like. At 56 kbps, such files may require an undesirably long amount of time to transfer between computers when utilizing voiceband modems. Further, many applications, such as those involving real-time video, are not possible.

In an attempt to mitigate the data transfer rate limitation associated with such contemporary voiceband modems, integrated services data network (ISDN) modems have been developed. Not only do such ISDN modems increase the data rate to approximately 112 Kbps in some instances, but ISDN also facilitates simultaneous use of multiple communications devices simultaneously. For example, an ISDN system may be configured so as to allow the simultaneous transmission of data from a computer and voice from a digital telephone. The use of ISDN necessitates the installation of an ISDN compatible switch by the telephone company.

The increased data rate of ISDN modems with respect to voiceband modems is due to the use of a substantially larger frequency spectrum, i.e., 0 Hz to 80 kHz, and the corresponding higher signaling rates which can be used.

The increasing popularity of such communication services as video on demand, video teleconferencing and high speed Internet access has further increased the need for higher data rates over twisted pair telephone lines. Even the comparatively high speed associated with ISDN is not adequate for providing such services as pay per view and real-time video-conferencing, which require data rates of at least 1.5 Mbps.

Digital subscriber line (DSL) provides a way of facilitating digital communications over twisted pair telephone lines at data rates in excess of 1.5 Mbps, so as to facilitate such desirable services as video on demand, video teleconferencing, high speed Internet access and the like.

It is worthwhile to note that, although fiber optic cable will provide data rates in excess of those possible utilizing DSL on twisted pairs, the installation of fiber optic cable to customer premises is costly and is expected to take more than a decade. Therefore, it is necessary to leverage existing twisted pair copper wiring. It should be noted that this alternative is particularly attractive to telephone companies, since their existing infrastructure provides the telephone companies with a distinct time-to-market advantage in the highly competitive communications business.

There are currently several different versions of DSL available. These include basic digital subscriber line (DSL), high data rate digital subscriber line (HDSL), single line digital subscriber line (SDSL), asymmetric digital subscriber line (ADSL) and very high bit rate digital subscriber line (VDSL).

Basic DSL provides a data rate of 160 kbps simultaneously in both directions over a single twisted pair of telephone lines for distances of up to approximately 18,000 feet.

HDSL is an extension of basic DSL and provides an improved method for transmitting T1/E1 signals. T1 is used primarily in North America and Japan and facilitates the simultaneous transmission of 24 digitized voice channels. E1 is used in most of the rest of the world and supports up to 30 simultaneous digitized voice channels.

HDSL uses an advanced modulation technique to facilitate a data rate of 1.544 Mbps over a twisted pair telephone line for a distance of up to approximately 12,000 feet. HDSL requires two twisted pairs of telephone lines, each twisted pair operating at 768 Kbps.

SDSL is a single line version of HDSL. In SDSL, T1/E1 signals are communicated over a single twisted pair. SDSL is suitable for such applications as servers and power LANs, which require symmetric data communications, wherein equal data rates in both the upstream and downstream directions are provided. SDSL is also suitable for such services as private line and frame relay.

ADSL is well suited for video on demand, home shopping, Internet access and remote LAN access, wherein the downstream data rate is comparatively high with respect to the upstream data rate. As mentioned above, the communication of video, such as MPEG movies, can require data rates in excess of 1.5 Mbps. However, this high bit rate is in the downstream direction only. The upstream control signals, which may be from simulated VCR controls, may require as little as 16 Kbps. It has been found that a ten to one ratio of downstream to upstream data rates is suitable for many such data communications applications.

VDSL, like ADSL, utilizes asymmetric data communications. However, VDSL operates at much higher data rates, which are facilitated by requiring shorter transmission distances via the twisted pair telephone lines. Further, a symmetric version of VDSL may be utilized in multimedia applications requiring similar data rates in both directions.

The various different types of DSL may be referred to collectively as either DSL or xDSL. DSL utilizes an advanced modulation scheme known as quadrature amplitude modulation (QAM), wherein a combination of amplitude and phase modulation is used to encode digital information for transmission over various media, including twisted pair copper telephone lines. Quadrature amplitude modulation (QAM) is based upon suppressed carrier amplitude modulation of two quadrature carriers, i.e., two carriers having a phase relationship of 90 degrees with respect to one another. Quadrature amplitude modulation (QAM) is an extension of multiphase shift keying modulation schemes, such as quadrature phase shift keying (QPSK). The primary difference between quadrature amplitude modulation (QAM) and quadrature phase shift keying (QPSK) is the lack of a constant envelope in quadrature amplitude modulation (QAM) versus the presence of such a constant envelope in phase-shift keying techniques.

Although quadrature amplitude modulated signals are theoretically allowed to have any number of discrete digital signal levels which the physical media will accommodate, common implementations of QAM systems have constellation sizes defined by powers of two, such as QAM-4, QAM-8, QAM-16, QAM-32, QAM-64, QAM-128, and QAM-256, wherein the number indicates how many discrete digital levels are utilized.

Thus, it will be appreciated that the use of quadrature amplitude modulation (QAM) facilitates the simultaneous transmission of a larger number of bits per symbol interval, e.g., up to 8 bits with QAM-256, so as to provide substantially enhanced bit rates. Each such simultaneous transmission of a plurality of bits is accomplished by encoding the bits into a symbol. Of course, the use of symbols which contain a larger number of bits requires higher signal to noise ratios (SNR) for adequate resolution. Although quadrature amplitude modulation (QAM) does provide a substantial increase in bit rate, as compared with earlier modulation schemes, such as those which are utilized in ISDN modems, it is still desirable to optimize the bit rate provided by quadrature amplitude modulation (QAM), so as to provide digital communication at the highest possible speed while maintaining the desired quality of service.

In implementing quadrature amplitude modulation (QAM), parameters such as symbol rate, center frequency and constellation size must be selected in a manner which tends to optimize the data rate and/or transmission SNR margin. The maximum symbol rate is uniquely determined by the communication bandwidth of the transmission medium. Thus, the maximum symbol rate depends upon the type of media, e.g., twisted pair copper telephone lines, coaxial cable, fiber optic cable, etc. utilized and also depends upon the amount of noise present in the environment of the transmission medium.

As those skilled in the art will appreciate, the useable bandwidth of any transmission medium is determined to a substantial degree by the amount of noise which is undesirably introduced into the transmission medium. For example, in a transmission medium having a nominal bandwidth of 300 kHz to 10 MHz, the undesirable ingress of environmental noise between 8.5 MHz and 10 MHz may limit the useable bandwidth to 300 kHz to 8.5 MHz.

The center frequency, like the symbol rate or bandwidth, depends upon the transmission medium and the quantity and nature of environmental noise.

The constellation size used according to quadrature amplitude modulation (QAM) is dependent upon the bandwidth, center frequency and signal to noise ratio (SNR). The signal to noise ratio (SNR) is dependent upon both the type of transmission medium and the presence of environmental noise.

Since the bit rate depends upon the symbol rate, center frequency and constellation size, it is desirable to optimize symbol rate, center frequency and constellation size in order to provide digital communication at an enhanced bit rate for use in such applications as DSL.

SUMMARY OF THE INVENTION

The present invention specifically addresses and alleviates the above-mentioned deficiencies associated with the prior art. More particularly, the present invention encompasses a method and apparatus for enhancing the bit rate and/or margin at which quadrature amplitude modulated (QAM) communication is performed. A bandwidth control, center frequency control, and a constellation size control cooperate to vary the spectral region and constellation size with which quadrature amplitude modulation (QAM) is performed. The bandwidth control, center frequency control, and the constellation size control may be either dedicated circuits or software implementations.

The bandwidth is varied by varying the stop frequency, while either varying or maintaining a substantially constant start frequency. The use of a constant start frequency minimizes the high frequency content of the bandwidth, which is subject to increasing levels of channel noise and distortion. In this manner, a combination of spectral placement and constellation size is defined at which the bit rate tends to be optimized.

In one aspect of the invention, the bandwidth is varied by varying the start and stop frequencies in discrete increments. Alternatively, the bandwidth may be varied by sweeping the start and stop frequencies in a substantially continuous manner.

In an additional aspect of the invention, a plurality of different constellation sizes are utilized so as to determine a maximum constellation size at which communication can occur without exceeding a predetermined bit error rate (BER) and while providing a desired margin.

The constellation size is suitably varied while maintaining a substantially constant bandwidth. This process may be repeated for a plurality of different bandwidths, as necessary. Alternatively, the bandwidth may be varied while maintaining a constant constellation size and repeating this step for a plurality of different constellations sizes.

These, as well as other advantages of the present invention, will be more apparent from the following description and drawings. It is understood that changes in the specific structure shown and described may be made within the scope of the claims without departing from the spirit of the invention.

BRIEF DESCRIPTION OF THE DRAWINGS

FIG. 5 is a chart depicting exemplary symbol rates, signal to noise ratios (SNRs), potential constellations, and potential bit rates associated with an example of the operation of the present invention;

FIG. 13 is a table of the VTU-R VOC echo opcode and data for different received VOC commands;

FIG. 15 is a table of the adaptive transmission parameters;

FIG. 16 is a table of the upstream symbol rates and center frequencies corresponding to the U_NOM VOC command;

FIG. 17 is a table of the downstream symbol rates and center frequencies corresponding to the D_NOM VOC command;

FIG. 20 is a table of the upstream constellation values as determined from upstream signal to noise ratio (SNR) and upstream margin;

FIG. 21 is a table of the downstream constellation values as determined from downstream signal to noise ratio (SNR) and downstream margin;

FIG. 23 is a table showing the IDLE and UTC messages;

FIG. 24 is a table of performance monitoring and control VOC messages; and

FIG. 25 is a table of the messages used to trigger PMD parameter changes.

DETAILED DESCRIPTION OF THE INVENTION

Figure 1:
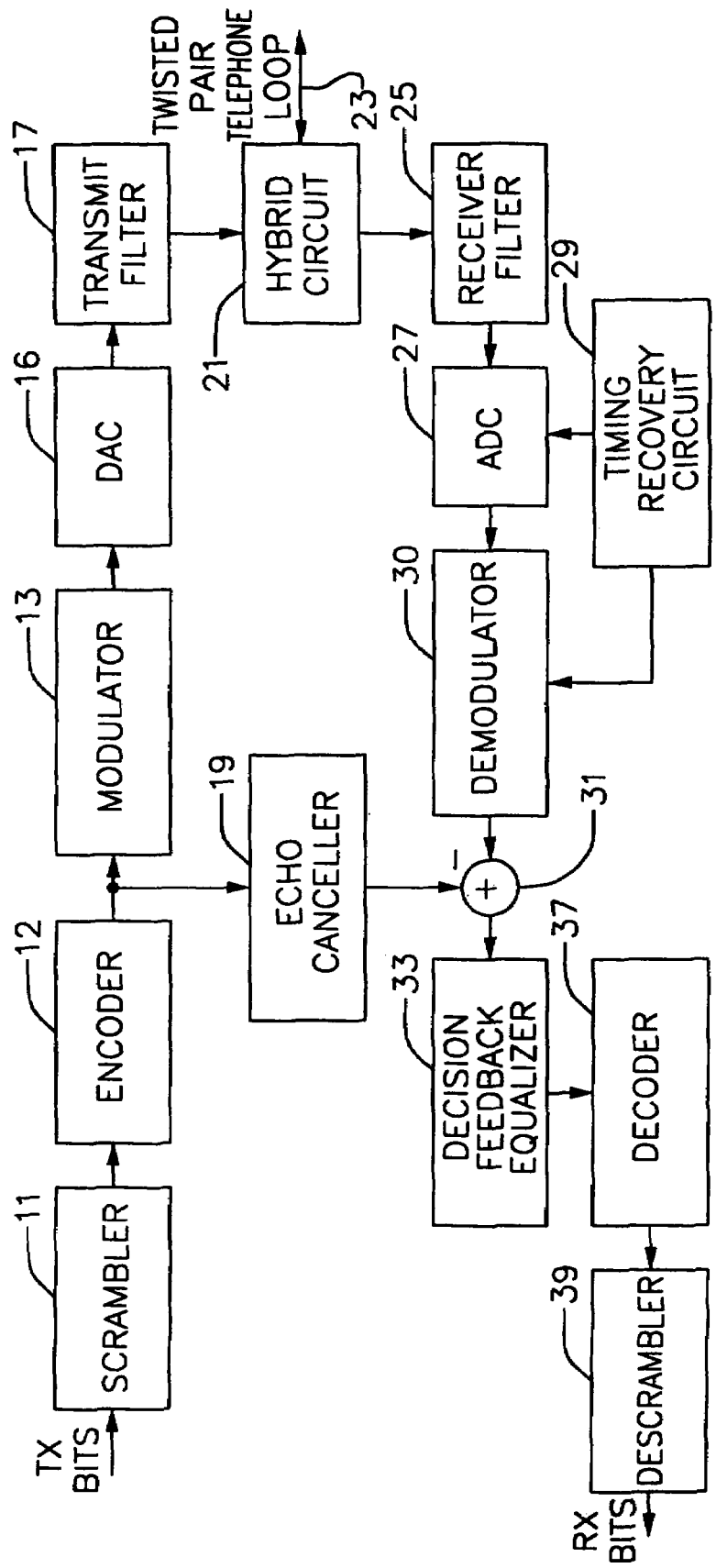
FIG. 1 is a simplified block diagram of a contemporary DSL transceiver according to the prior art.

While the present invention is open to various modifications and alternative constructions, an exemplary embodiment as illustrated in the drawings will be described herein in detail. It is to be understood, however, that there is no intention to limit the invention to the particular forms disclosed. On the contrary, it is intended that the invention cover all modifications, equivalences and alternative constructions falling within the spirit and scope of the invention as expressed in the appended claims.

The method and apparatus for providing rate adaptation for digital subscriber line (DSL) transceivers of the present invention is illustrated in FIGS. 2-25, which depict a particular exemplary embodiment thereof. FIG. 1 depicts a contemporary DSL transceiver.

Referring now to FIG. 1, a contemporary DSL transceiver incorporates a scrambler 11 which intermixes an incoming digital data stream so as to prevent the transmission of long streams of zeros or ones, which tend to make synchronization difficult. The use of a scrambler 11 may, in some instances, make the subsequent coding process more efficient.

An encoder 12 applies optional Forward Error Correction (FEC) and maps the resulting data into QAM symbols. The modulator 13 represents these symbols in a form suitable for transmission through the channel, utilizing quadrature amplitude modulation (QAM) with a fixed bandwidth, center frequency, and constellation size. For example, the encoder 12 may utilize a 256 point constellation to encode each symbol with 8 bits of data (although the use of Trellis and/or Reed-Solomon FEC coding may reduce the actual average number of payload data bits encoded into each symbol, as redundant bits which facilitate forward error correction (FEC) are added). The modulator 13 outputs samples of the modulated waveform to the digital to analog converter (DAC) 16, which optionally contains a pulse shaping function to assure that the pulses output thereby are well defined.

The analog signal output by the DAC 16 is provided to transmit filter 17, which typically includes a low pass filter (e.g., third order Butterworth) which removes undesirable high frequency components generated by the DAC 16. In this manner, the transmit filter 17 reduces undesirable out-of-band energy.

A hybrid circuit 21 facilitates full duplex-type communications over the twisted pair telephone line 23. In the case where the transceiver is transmitting, the hybrid circuit 21 inhibits undesirable introduction of the transmitted communication signals back into the receiver filter 25 of the transceiver, while permitting transmission of the communication signals to the twisted pair telephone loop 23. In the case where the transceiver is receiving a communication signal, the hybrid circuit 21 routes the communication signal to the receiver filter 25. Thus, the hybrid circuit 21 is capable of separating the downstream channel from the upstream channel and routing the intelligence present on each channel to its intended destination. The receiver filter 25 is typically a third-order Butterworth low pass filter. The receiver filter mitigates the undesirable presence of out-of-band noise in a manner similar to that described in connection with transmit filter 17.

Analog to digital converter (ADC) 27 converts the received analog signal to digital form for further processing. Typically, preamplification is necessary so as to bring the received signal to the voltage level required by the analog to digital converter 27. The analog to digital converter 27 may be synchronized to timing recovery circuit 29, which facilitates synchronization of two communicating transceivers. Recovered timing is also applied to the demodulator 30, which converts the modulated waveform back to (noisy and distorted) QAM symbols.

Encoded symbols, which are directed to the modulator 13 by the encoder 12, are also provided to an echo canceller 19 which generates an echo signal characterized by the transmission medium. The echo canceller 19 is constructed so as to mimic the echo path commonly found to exist between two bi-directionally communicating transceivers, and is commonly characterized as including the transmit filter, the hybrid circuit, the receiver filter, and the analog to digital converter, as well as the transmission medium. The sampling rate of the encoder 12 is synchronized to the analog to digital sampling clock 27, so as to maintain a stable echo path transfer function.

A summer 31 facilitates the removal of a substantial portion of the actual echo from the output of the demodulator 30 by subtracting the generated echo signal output of the echo canceller 19 from the received signal. As those skilled in the art will appreciate, echos result from impedance mismatches such as those caused by bridged taps, which are common in the Public Switched Telephone Network (PSTN).

After the received signal has been digitized by the analog-to-digital converter 27, shifted to baseband (demodulated) by the demodulator 30, and had a substantial portion of the echo component thereof removed by the summer 31 in combination with the echo canceller, the received signal is filtered and equalized by decision feedback equalizer 33. The equalized QAM symbol sequence is converted back into a representation of the original scrambled information bit stream by a decoder 37. Descrambler 39 reverses the scrambling process provided by scrambler 11, so as to reconstruct the original data stream.

According to this example of a contemporary DSL transceiver, symbol rate, transmission center frequency and constellation size are all pre-defined and "built-in" to the operational parameters of any given transceiver optimized for a specific communication application. In the conventional model, as exemplified by the prior art, no attempt is made to optimize symbol rate, center frequency and constellation size for more efficient bandwidth utilization or bit rate enhancement.

Figure 2:
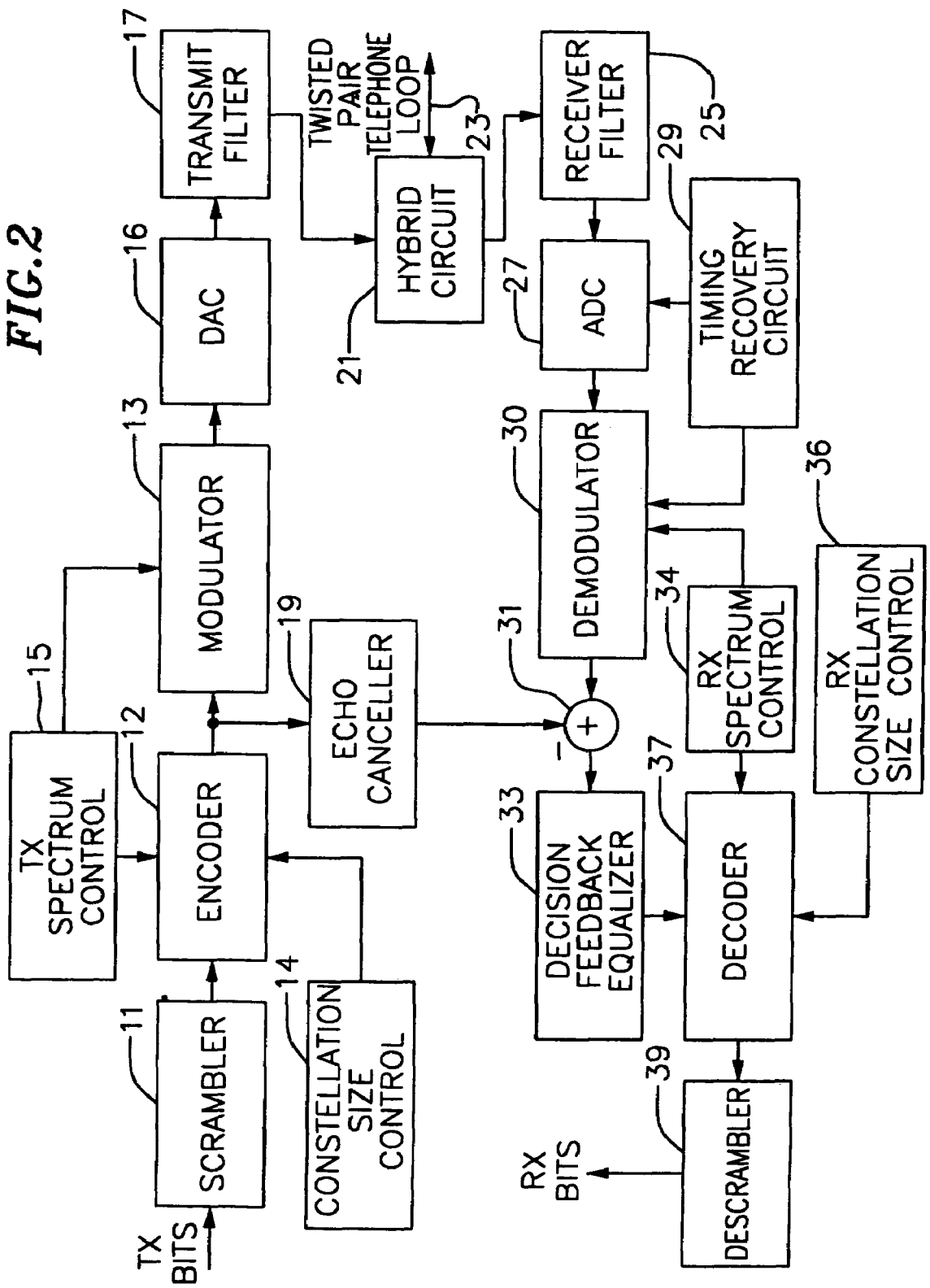
FIG. 2 is a block diagram of an exemplary DSL transceiver having variable spectral allocation and constellation size according to the present invention.

Referring now to FIG. 2, an exemplary embodiment of a transceiver circuit, suitable for practice of principles of the present invention, is illustrated in simplified block diagram form. In the figure, functional blocks similar to those of the exemplary prior art embodiment of FIG. 1 are identified with like reference numerals. In the exemplary transceiver, and according to the present invention, the symbol rate, center frequency and constellation size of communicated intelligence signals are optimized so as to promote digital communication at an enhanced bit rate and/or noise margin. The symbol rate, which is equivalent to the bandwidth over which the communication takes place, and the communication spectrum center frequency are controlled by a transmit spectrum control circuit 15, coupled to the encoder 12 and modulator 13, and a receive spectrum control circuit 34, coupled to the demodulator 30 and decoder 37. Transmit spectrum control 15 controls the symbol rate utilized by encoder 12 and the center frequency utilized by modulator 13 during the encoding and modulation processes. Similarly, receive spectrum control 34 controls the symbol rate utilized by decoder 37 and the center frequency utilized by demodulator 30.

Transmit constellation size control circuitry 14, coupled to the encoder 12, facilitates varying the constellation size utilized by encoder 12, to values in the range of from about a constellation size of 2 to about a constellation size of 256. Receive constellation control circuitry 36, coupled to the decoder 37, facilitates varying the constellation size utilized by decoder 37, to a similar constellation size range of between 2 and 256. Denser constellations (those with values exceeding 256) may also be supported using the techniques described below, as are constellations having values not equal to a power of 2 (i.e., fractional bit constellations).

As described in detail below, methods for determining efficient combinations of spectral allocation and constellation size are defined which provide communication at an enhanced bit rate and/or margin. "Spectral allocation" refers to the frequency range over which a transmit signal possesses an appreciable amount of energy. Spectral allocation is varied by simultaneously varying center frequency and symbol rate. Thus, the invention provides a method for dynamically optimizing symbol rate, center frequency and constellation size so as to provide digital communication at an enhanced bit rate and/or margin for use in such applications as very high bit rate digital subscriber line (VDSL).

Figure 3:
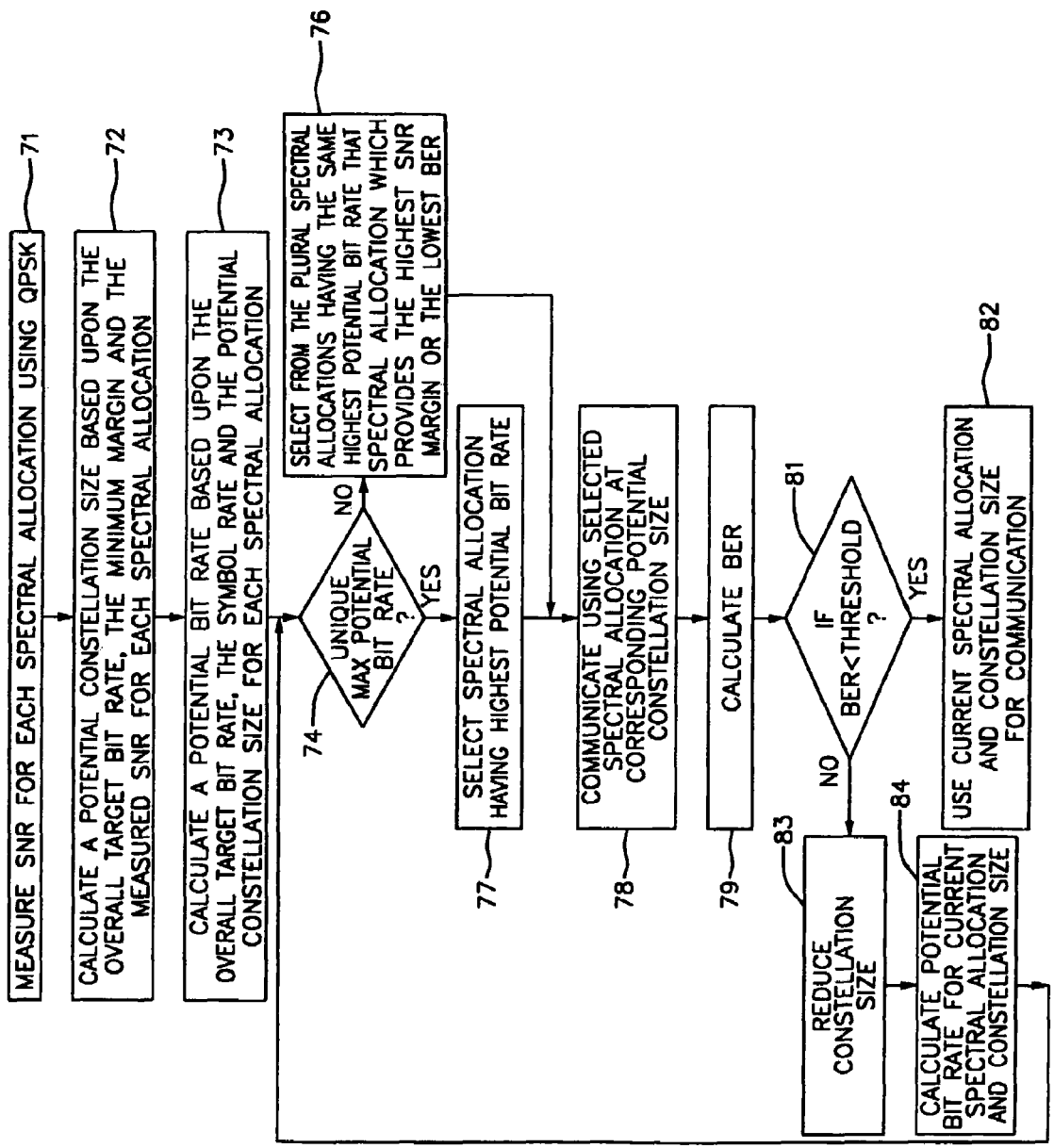
FIG. 3 is a flow chart showing the method for providing rate and/or margin optimization according to an exemplary embodiment of the present invention.

Referring now to FIG. 3, a simplified flow diagram illustrates an exemplary method for performing bit rate and/or error margin optimization for use in bidirectional communication systems generally and digital subscriber line (DSL) transceivers in particular. Briefly, the illustrated method involves "evaluating" certain chosen channel characteristics, such as signal-to-noise-ratio (SNR) or bit error rate (BER) with respect to controlled variations in transmission signal parameter metrics, such as constellation size, spectral allocation, and the like. As shown in FIG. 3, at 71, the exemplary method involves measuring a channel signal-to-noise-ratio (SNR) for each of a number of spectral allocations, using a modulation technique such as QPSK, which is likely to result in successful communication. Channel SNR is measured by one transceiver initiating communication with another, over the channel of interest, and evaluating the channel with what might be termed training signals. Training signals would necessarily contain sufficient information to allow the initiating transceiver to evaluate the returning bit stream for noise margin and BER.

The potential constellation size, for each spectral allocation, is next calculated, as indicated at 72. Potential constellation sizes are based upon a desired overall target bit rate, a noise margin threshold figure of merit and the measured signal to noise ratio (SNR) for each spectral allocation. This calculation 72 proceeds as follows. First, a constellation size is selected from a multiplicity of constellation sizes by a table look-up method, based on measured SNR and desired minimum margin, as described in more detail below. Next, the bit rate, which would result if that constellation were used in combination with the corresponding spectral allocation, is computed and the computed result compared to the desired overall target bit rate. From the computation of resultant bit rate, three conclusion cases are evident.

In the first case, the calculated bit rate is less than or equal to the overall desired target bit rate. In this case the potential constellation for the current spectral allocation is identified as the constellation selected in the table look-up.

The second and third cases arise when the calculated bit rate exceeds the desired target bit rate. In case-two, one or more constellation sizes smaller than the selected constellation produce bit rates which, while smaller than the table look-up bit rate first calculated, still equal or exceed the desired target rate. In this case, the potential constellation is identified as the smallest of these reduced constellations, so that, with the forward error correction (FEC) payload percentage maintained at its current nominal value, the corresponding bit rate either equals the overall target bit rate, or exceeds it by the minimum amount possible.

Finally, in the third case, no constellation size smaller than that initially selected by the table look-up provides a bit rate that more closely approximates the overall desired target bit rate. In this case, the table look-up constellation is identified, by default, as the potential constellation size for the current spectral allocation.

Following identification of potential constellation size 72, a potential bit rate based upon the symbol rate and the potential constellation size for each spectral allocation is then calculated, as indicated at 73. The formula used to perform the calculation is: Potential Bit Rate=(Symbol Rate) (FEC Payload Percentage) $\log_2$ (Potential Constellation Size). If this calculation results in a bit rate which exceeds the overall target rate, the potential bit rate is recorded as being equal to the target bit rate, and optionally, the FEC payload percentage is decreased so that the rate calculated in 73 would actually equal the target rate.

Calculation of the potential bit rate in this manner for each spectral allocation may, in some instances, result in more than one potential bit rate exhibiting a maximum value across the set of spectral allocations. When the maximum potential bit rate is unique, as indicated at 74, then the spectral allocation having the highest potential bit rate is selected (77).

When more than one spectral allocation achieves the maximum potential bit rate, then one of these is selected, as indicated at 76, from the spectral allocations having the same highest potential bit rate. Preferably, that spectral allocation which provides either the highest signal to noise ratio (SNR) margin or the lowest bit error rate (BER) is selected. Either criteria, i.e., the highest signal to noise ratio (SNR) margin or the lowest bit error rate (BER) may be utilized, as desired. Communication is then allowed to proceed, as indicated at 78, using the selected spectral allocation at the potential constellation size which was calculated therefore.

The bit error rate (BER) is then calculated 79. This can be done using FEC receiver processing or through the use of known bit sequences imbedded in the bit stream. As shown at 81, if the bit error rate (BER) is less than a predetermined threshold value, then steady state data communication 82 is commenced using the selected spectral allocation and corresponding potential constellation size.

Thus, optimization has been performed. Optimization of spectral allocation, according to this method, optimizes mode symbol rate and center frequency. This optimization of spectral allocation and constellation size may be utilized for any desired period of time. Thus, optimization may be performed only once for the entire amount of data being communicated, or, alternatively, may be repeated periodically, as desired.

If 81 the bit error rate (BER) is greater than or equal to the predetermined threshold, then the potential constellation size for the current spectral allocation is reduced 83 and a new potential bit rate for the current spectral allocation, and corresponding to the new reduced constellation size, is calculated 84. This new potential bit rate for the current spectral allocation replaces that previously associated with that spectral allocation, and uses the formula described for step 73. Processing then continues at block 74 as previously described.

This process is discussed in further detail below, wherein a specific example of the optimization process is provided. Those skilled in the art will appreciate that the algorithm thus described for FIG. 3 maximizes the delivered bit rate, subject to the given minimum SNR margin and maximum BER constraints, for channels which cannot achieve the overall target bit rate. For channels which can achieve the overall target bit rate, the algorithm delivers the overall target bit rate in a way which maximizes margin or minimizes BER. Those skilled in the art will also appreciate that the algorithm can be used to deliver the maximum possible bit rate (subject to given margin and BER constraints) without further limitation merely by setting the overall target bit rate to an unachievably high value.

Figure 4:
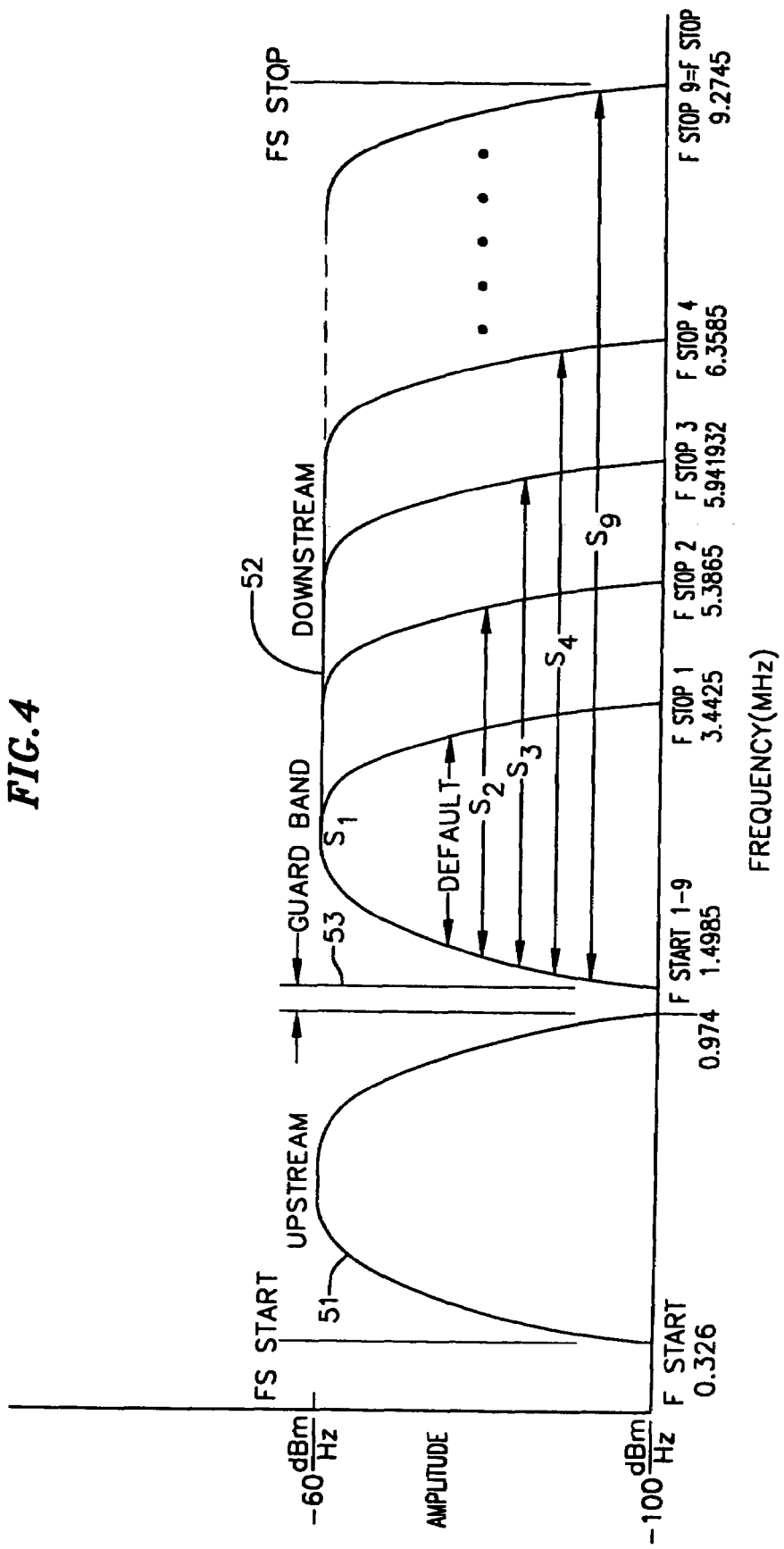
FIG. 4 is a graph showing the upstream frequency spectrum and the variable bandwidth downstream frequency spectrum according to the present invention.

Referring now to FIGS. 4 and 5, a specific example of the method by which symbol rate, center frequency and constellation size are optimized so as to provide enhanced bit rates and/or margin during digital communications, such as in VDSL is discussed in further detail.

Although this example utilizes VDSL, such is by way of illustration only and not by way of limitation. Those skilled in the art will appreciate that the present invention may find application in other types of DSL, and indeed may be used to optimize quadrature amplitude modulation (QAM) in a variety of different applications.

With particular reference to FIG. 4, a frequency spectrum having a predetermined bandwidth within which communication between two transceivers is to be performed is first defined. The frequency spectrum includes a beginning (FSstart) at a low frequency end thereof and an end (FSstop) at a high frequency end thereof. The frequency spectrum is typically defined by the telephone company, which often determines the total communication bandwidth which it will make available for DSL service.

Two channels, an upstream channel 51 and a downstream channel 52, are defined within the frequency spectrum. The upstream channel 51 facilitates communication from the subscriber to the network, while the downstream channel 52 facilitates communication from the network to the subscriber. According to the illustrated embodiment of the present invention, the upstream channel 51 is defined such that it occupies a lowermost portion of the frequency spectrum and the downstream channel 52 is defined adjacent to the upstream channel 51 such that it occupies a comparatively low frequency portion of the remaining frequency spectrum. Preferably, a guard band 53 is provided intermediate the upstream channel 51 and the downstream channel 52, so as to mitigate the undesirable occurrence of crosstalk therebetween.

Thus, according to the exemplary embodiment of the present invention, the upstream channel 51 is defined so as to occupy a lower frequency portion of the spectrum than the downstream channel 52. This allows room for expansion of the downstream channel 52, so as to facilitate operation of the downstream channel 52 at an enhanced data rate as compared to the upstream channel 51.

In some applications, the downstream channel 52 bandwidth requirements far exceed the upstream channel 51 bandwidth requirements. This is of particular significance in an asymmetric communications system, such as VDSL, wherein the downstream channel will often contain MPEG movies, such as those of pay per view. By way of contrast, the upstream channel in such applications merely needs to facilitate the transmission of control signals, such as those used to simulate the functionality of a video cassette recorder (VCR), e.g., play, fast forward, rewind, stop, pause, etc.

However, those skilled in the art will appreciate that the upstream channel may alternatively be defined so as to occupy a higher frequency portion of the frequency spectrum than the downstream channel, if desired.

Communication is first established between two DSL transceivers of the present invention (such as the DSL transceiver shown in FIG. 2) using default parameters which assure reliable communication therebetween. The two DSL transceivers may optionally be pre-defined as master and slave to prevent contention problems during initialization. However, in many applications this distinction is not important, so that the definitions may be arbitrary. The need to predefine master and slave DSL transceivers may be eliminated via the use of either standard or custom contention algorithms.

The default parameters include the above mentioned positioning of the upstream channel 51 and downstream channel 52 within the frequency spectrum, the use of a small constellation size (such as that provided by QPSK), and the use of a comparatively small bandwidth (and consequently a low symbol rate).

It should be noted that such use of low frequency channel allocations as default parameters tends to mitigate the problems commonly associated with bridged taps, since the dips in the frequency spectrum caused by bridged taps are deeper and therefore more damaging when they occur at higher frequencies. Additionally, since twisted pair channel loss increases with increasing frequency, low frequency default spectral allocations also tend to increase default channel SNR.

During default initialization, the master transceiver begins transmitting on the downstream channel 52 and continues to transmit until the slave acquires synchronization and an acknowledgment of synchronization is transmitted from the slave to the master on the upstream channel 51.

According to the illustrated embodiment of the present invention, the upstream channel 51 is fixed in bandwidth and center frequency, i.e., the upstream channel uses a single fixed spectral allocation. However, the downstream channel 52 is fixed only in the start frequency (FSTART1-9), such that the center frequency and end frequency (Fstop) may vary during optimization. Thus, on the downstream channel multiple spectral allocations are considered, and a determination of the optimal symbol rate, center frequency and constellation size is made.

Briefly, optimization is performed by varying the spectral allocation, i.e., symbol rate and center frequency, of the downstream channel 52 and measuring a signal to noise ratio (SNR) for each different spectral allocation of the downstream channel (step 71 of FIG. 3). A potential constellation size for each different bandwidth is calculated using the measured signal to noise ratio (SNR), the desired minimum SNR margin, and the overall target bit rate (step 72 of FIG. 3). A potential bit rate is then calculated from the FEC payload percentage and the symbol rate and the potential constellation size for each spectral allocation (step 73 of FIG. 3). The spectral allocation which provides the highest actual bit rate up to the overall target bit rate, or the highest signal to noise ratio (SNR) margin or lowest bit error rate (BER) among all spectral allocations whose potential rates equal or exceed the overall target bit rate, is then repeatedly selected (step 74, 76 and 77 of FIG. 3) and the potential constellation size for that spectral allocation is determined in an iterative process (steps 78, 79, 81, 83, and 84 of FIG. 3) so as to optimize the data transmission rate, signal to noise ratio (SNR) margin and/or bit error rate (BER) as illustrated further below.

More particularly, the optimization process is performed by communicating (the content of the communicated message is not relevant) via the downstream channel 52 while varying the spectral allocation of the downstream channel 52 and while maintaining a constant constellation size (step 71 of FIG. 3). According to the exemplary embodiment of the present invention, illustrated in the spectral allocation in FIG. 4, the resulting spectral allocations are S1 (initial or default allocation), S2, S3, S4 and S9. There are actually 9 separate spectral allocations according to this example and spectral allocations S5, S6, S7, and S8 are omitted from FIG. 4 for clarity. However, those skilled in the art will appreciate that other frequency increments and/or numbers of different spectral allocations are likewise suitable. Indeed, the symbol rate and center frequency may alternatively be swept, such that the spectral allocation varies continuously.

In defining the downstream spectral allocation, the start frequency, FSTART1-9, is maintained and the end frequency is varied so as to minimize the high frequency content of the downstream channel. Minimizing the high frequency content of the channel tends to increase received SNR and mitigate problems associated with bridged tapes as discussed above. Varying the spectral allocation in this manner simultaneously varies the symbol rate and center frequency of the downstream channel, so that optimization is performed for center frequency, as well as symbol rate or bandwidth.

The constellation size utilized at this time is that of a constellation which can reliably be transmitted at all of the different spectral allocations utilized. Preferably, QPSK (QAM-4) is utilized. However, those skilled in the art will appreciate that various other different modulation techniques and/or constellation sizes are likewise suitable.

With particular reference to FIG. 5, the potential bit rate is determined for each of the discrete spectral allocations (S1 through S9) utilized, so as to form a tabulation thereof (step 73 of FIG. 3). If the spectral allocation was swept rather than stepped in a discrete manner, then a corresponding curve of potential bit rates would be generated instead of the tabulation of FIG. 5. The potential bit rate is calculated by multiplying the symbol rate by the logarithm to the base 2 of the potential constellation size computed for that spectral allocation, and multiplying further by the FEC payload percentage (assumed equal to 1 in this example for simplicity). As described previously for step 72 of FIG. 3, the calculation of the potential constellation size for each spectral allocation supports the algorithm goal of maximizing bit rate for channels which cannot achieve the overall target bit rate (25.92 Mbps in this example), and delivering the target bit rate in a manner which maximizes margin or minimizes BER for those channels which can achieve the target rate.

The spectral allocation having the highest of the potential bit rates is next selected (step 77 of FIG. 3). This spectral allocation is, of course, a logical choice for the optimal spectral allocation, although it may not ultimately be selected as the spectral allocation which provides the highest actual bit rate since this initial selection is based upon a theoretical maximum potential bit rate, which is in turn determined by a potential constellation size that may not be achievable (and indeed is not always achieved according to this example).

If two or more spectral allocations have the same potential bit rates, then one of the tying spectral allocations is chosen by maximizing signal to noise ratio (SNR) margin, minimizing bit error rate (BER), maximizing tolerance to a certain noise source, or by any other desired means, including an arbitrary selection of the bandwidth (step 76 of FIG. 3). The incidence of such a tie for maximum potential bit rate between two or more spectral allocations may occur with or without the overall target bit rate being achievable for the channel at hand.

As shown in the tabulation of FIG. 5, spectral allocation S2, corresponding to the second downstream bandwidth shown in FIG. 4, has, based on signal to noise ratio (SNR) and an illustrative assumed minimum signal to noise ratio (SNR) margin of 3 dB, a maximum potential bit rate of 25.92 Mbps. As shown in FIG. 5, initial table entries also indicate a potential rate of 25.92 Mbps for S3, S4, S5, and S7. Note in particular that S3 has sufficient SNR to warrant the use of QAM-256, but, according to the algorithm of FIG. 3, QAM-128 is initially selected as its corresponding potential constellation, since QAM-128 delivers the overall target rate of 25.92 Mbps. Notice also that for S4, the product of its symbol rate (4.05 Mbaud) and the base 2 logarithm of its potential constellation (QAM-128) is greater than the overall target bit rate of 25.92 Mbps, but according to the algorithm the target rate of 25.92 Mbps is instead recorded, and the FEC payload percentage optionally decreased.

Of these spectral allocations which achieve the maximum potential bit rate of 25.92 Mbps, S2 has the highest SNR margin (7 dB), and spectral allocation S2 is thus initially selected (step 76 of FIG. 3). It will be appreciated that the symbol rate is directly dependent upon bandwidth and that the terms bandwidth and symbol rate may generally be used interchangeably herein.

Communication is then performed using the selected spectral allocation at the corresponding potential constellation size (step 78 of FIG. 3). For this example the potential constellation size is calculated assuming a 3 dB minimum margin. However, a different minimum margin requirement and/or a maximum constellation size may alternatively be predetermined by the telephone company. The potential constellation size for S2 is 256. Because the potential constellation size is determined theoretically, based upon the SNR and using an assumed margin, it will not always be possible to communicate at or below the desired bit error ratio (BER) at a given spectral allocation utilizing the potential constellation. Thus, it may sometimes be necessary to reduce the constellation size for a given spectral allocation in order to achieve desirably reliable communication at that spectral allocation.

The potential constellation size is thus dependent upon the actual signal to noise ratio (SNR), the overall target bit rate, and the desired minimum margin. For the example of FIG. 5, the potential constellation size is initially calculated according to the formula:

Constellation size=
{0 if <=(SNR−margin)<10 dB;
4 if 10 dB<=(SNR−margin)<16 dB;
8 if 16 dB<=(SNR−margin)<19 dB;
16 if 19 dB<=(SNR−margin)<22 dB;
32 if 22 dB<=(SNR−margin)<25 dB;
64 if 25 dB<=(SNR−margin)<28 dB;
128 if 28 dB<=(SNR−margin)<31 dB;
256 if 31 dB<=(SNR−margin)}.

As described above, the constellation size thus calculated will then be reduced from this initial value if one or more smaller constellations can still deliver the overall target bit rate with the current spectral allocation.

The bit error rate (BER) is calculated (step 79 of FIG. 3) while communicating with the selected spectral allocation at the corresponding potential constellation size. If the bit error rate (BER) indicates (step 81 of FIG. 3) that the quality of the channel is sufficiently good, then that spectral allocation is selected and the potential constellation size is selected (step 82 of FIG. 3) as the optimal constellation size. As mentioned above, specifying the spectral allocation is equivalent to specifying the symbol rate (bandwidth) and center frequency.

If the bit error rate (BER) does not indicate that the quality of the channel is sufficiently good, then the constellation size corresponding to the present spectral allocation is reduced (step 83 of FIG. 3), preferably to one-half that of the present constellation size (although other size increments may alternatively be utilized) and the potential bit rate for the present spectral allocation and new constellation size is calculated (step 84 of FIG. 3) in the manner previously described for step 73 of FIG. 3.

Following this the algorithm returns to step 74 of FIG. 3, where the search for the spectral allocation with highest potential bit rate is performed anew (step 77 of FIG. 3). As before, the occurrence of a maximum potential bit rate tie is decided by selecting that spectral allocation with highest SNR margin from amongst the set of tying contenders (step 76 of FIG. 3).

Thus, according to the present invention, that spectral allocation having the highest potential bit rate is repeatedly selected. Associated with each spectral allocation is a potential constellation size, determined initially as the maximum constellation size which will support communication at the measured SNR and given minimum margin for that spectral allocation. However, when one or more constellation sizes smaller than this largest usable constellation still deliver the overall target bit rate, the smallest of these constellations will be selected instead, thereby increasing the margin associated with the current spectral allocation while still allowing it to deliver the overall target bit rate.

If a given spectral allocation becomes considered as a candidate for the optimal spectral allocation, it is bit error rate tested using its corresponding selected potential constellation. If this bit error rate test fails, then the potential constellation associated with that spectral allocation is reduced. If the constellation size must be reduced in order to obtain reliable communication with the selected spectral allocation, then a new spectral allocation is selected when such reduction of the constellation size results in the present spectral allocation no longer having the maximum potential bit rate. In this manner, the spectral allocation which provides the maximum potential bit rate is always selected. This process repeats until a spectral allocation is selected which does not require a reduction in constellation size. As described previously, the choice among a set of spectral allocations which all deliver the same maximum potential bit rate is made on some predefined basis, e.g., maximum margin or minimum BER.

The example provided in FIG. 5 assumes that use of the potential constellation size of 256 for S2 resulted in an unacceptable bit error rate (BER). Thus, as shown, the constellation size for S2 was reduced to 128 and the maximum potential bit rate was changed from 25.92 Mbps to 22.68 Mbps.

The process of communicating while utilizing the selected spectral allocation, determining the bit error rate (BER) and reducing the constellation size and again determining the potential bit rate are thus repeated until the selected spectral allocation provides communication with the bit error rate (BER) being indicative that the quality of the channel is adequate, such that communications can continue at that particular spectral allocation.

As shown in the tabulation of FIG. 5, after the constellation size for S2 was reduced from 256 to 128, then the new potential bit rate of 22.68 Mbps for S2 was no longer among the highest of all of the potential bit rates (for all of the different spectral allocations). Instead, 25.92 Mbps is still the highest potential bit rate, but now only for spectral allocations S3, S4, S5, and S7. Of these, S3 now has the highest SNR margin (6 dB), and hence S3 is selected (step 76 of FIG. 3) for BER testing at its potential constellation size of 128 (steps 78 and 79 of FIG. 3).

In this example, the measured BER again is assumed to exceed the maximum limit, so that the potential constellation size for S3 is reduced from 128 to 64 (step 83 of FIG. 3). This reduces the potential rate associated with S3 (step 84 of FIG. 3) from 25.92 Mbps to 22.21716 Mbps. Re-evaluation (step 74 of FIG. 3) of the potential bit rate column in FIG. 5 now shows that only S4, S5, and S7 are left with the highest potential rate of 25.92 Mbps. Of these S7 has the highest SNR margin (4 dB), and hence it is next selected for BER testing at its potential constellation size of 32 (steps 76, 78, and 79 of FIG. 3). Finally, the example assumes that the potential constellation size of 32 for S7 results in an acceptable bit error rate (BER) (as indicated in FIG. 5 by the fact that the potential bit rate of 25.92 Mbps for S7 has not been crossed out and replaced with a new potential bit rate), so the iteration process is complete (step 82 of FIG. 3).

Whenever the process fails, such that the communication link is lost, then communication is reestablished utilizing the upstream and downstream channels with default parameters.

The present invention may also be used to enhance reliability of communications when the maximum bit rate is preset, constrained or otherwise limited. In the discussion thus far, such a bit rate limitation has been described in the context of an overall target bit rate, although alternative formulations, e.g., a hard limit on maximum rate, are also applicable. The general point is that when a system is physically capable of transmitting at greater than some specified bit rate (but for some reason is not permitted to), then the communications parameters may be optimized so as to deliver that specified bit rate in a way which minimizes bit error rate (BER) or maximizes SNR margin.

This invention provides an algorithm which optimizes the parameters of a quadrature amplitude modulation (QAM) transmission system, according to one of several different optimization criteria, all of which are implementable with the algorithm. The quadrature amplitude modulation (QAM) transmission parameters in question are: symbol rate and center frequency (which together are analogous to spectral allocation), constellation size, and forward error correction (FEC) payload percentage. A particular (spectral allocation, constellation, FEC payload percentage) ordered triplet delivers a particular bit rate, and for a given channel will do so with an associated SNR margin and bit error rate (BER).

A goal of the algorithm is, for a given channel and a given one of the optimization criteria below, automatically determine and use the corresponding optimizing (spectral allocation, constellation, FEC payload percentage) set. The different optimization criteria which can be selected are:

1) Maximize the bit rate subject to minimum SNR margin and maximum bit error rate (BER) constraints. If two or more (spectral allocation, constellation, FEC payload percentage) sets deliver the same maximizing bit rate while also meeting the minimum signal to noise ratio (SNR) margin and maximum bit error rate (BER) constraints, from these QAM parameter sets pick the one which yields the maximum SNR margin. This optimization criteria is implemented by the algorithm as described above, with the specific instruction that if two or more spectral allocation entries in the table have the same maximizing potential bit rate, pick the one with maximum margin for bit error rate (BER) testing at its potential constellation. Then proceed as before.

2) Maximize the bit rate subject to minimum SNR margin and maximum bit error rate (BER) constraints. If two or more (spectral allocation, constellation, FEC payload percentage) sets deliver the same maximizing bit rate while also meeting the minimum SNR margin and maximum bit error rate (BER) constraints, from these QAM parameter sets pick the one which yields the minimum bit error rate (BER). This optimization criteria is implemented by the algorithm as described above, with the additional step that if two or more spectral allocation entries in the table have the same maximizing potential bit rate, all of these must be BER tested at their potential constellations to see which one is lowest. If none of them pass the BER test then we proceed as before, namely, reduce constellation sizes for those spectral allocations who failed the BER test and re-evaluate the table. If one of them does pass the BER test, then as before we are done.

3) Maximize first the bit rate, and secondly maximize SNR margin, subject to minimum SNR margin, maximum bit error rate (BER), and target or maximum bit rate constraints. The first maximization is identical to that in (1) above, except that for each given spectral allocation, only those (spectral allocation, constellation, FEC payload percentage) sets which deliver an associated bit rate not exceeding the overall bit rate target or maximum bit rate constraint are considered. This difference is implemented in the algorithm as currently described by evaluating the potential bit rate associated with each spectral allocation, but with the additional step that if that bit rate exceeds the overall target bit rate, reduce the constellation size and/or decrease the FEC payload percentage until this is no longer the case. Specifically, the constellation size is first reduced to the minimum value which still provides a potential bit rate equal to or greater than the overall target rate (for an FEC payload percentage assumed held constant). Following this, if the potential rate is greater than the target rate, the FEC payload percentage may be decreased until the potential and target bit rates are equal. Following this, the second maximization occurs if two or more such (spectral allocation, constellation, FEC payload percentage) sets deliver the same maximizing bit rate, be that rate equal to or less than the overall target or maximum rate, while also meeting the minimum SNR margin and maximum bit error rate (BER) constraints. In this case, just as in (1) above, the selected parameter set is the one which yields the maximum SNR margin.

4) Maximize first the bit rate, and secondly minimize bit error rate (BER), subject to minimum SNR margin, maximum bit error rate (BER), and target or maximum bit rate constraints. The first maximization is identical to that in (2) above, except that for each given spectral allocation, only those (spectral allocation, constellation, FEC payload percentage) sets which deliver an associated bit rate not exceeding the overall target or maximum bit rate constraint are considered. The corresponding algorithm is exactly the same as discussed above in (3) above, except for handling of the second maximization. The second maximization occurs if two or more such (spectral allocation, constellation, FEC payload percentage) sets deliver the same maximizing bit rate, be that rate equal to or less than the target or maximum rate, while also meeting the minimum SNR margin and maximum bit error rate (BER) constraints. In this case, as in (2) above, the selected parameter set is the one which yields the minimum bit error rate (BER).

5) Maximize the SNR margin for a given fixed bit rate, assuming that it is possible to achieve that fixed bit rate with at least one (spectral allocation, constellation, FEC payload percentage) set with nonnegative SNR margin. This optimization criteria is effectively implemented by optimization criteria (3) above, by setting the target or maximum bit rate constraint in (3) equal to the given fixed bit rate of (5), and setting the minimum SNR margin constraint in (3) above equal to 0 dB.

6) Minimize the bit error rate (BER) for a given fixed bit rate, assuming that it is possible to achieve that fixed bit rate with at least one (spectral allocation, constellation, FEC payload percentage) set with nonnegative SNR margin. This optimization criteria is effectively implemented by optimization criteria (4) above, by setting the target or maximum bit rate constraint in (4) equal to the given fixed bit rate of (6), setting the minimum SNR margin constraint in (4) equal to 0 dB, and setting the maximum bit error rate (BER) constraint in (4) to an arbitrarily high number (e.g., 0.5).

Exemplary Implementation

With reference to FIGS. 6-25, an exemplary implementation of the present invention is described below for use in VDSL systems operating under QAMLink, a software product of Broadcom Corporation, Irvine, Calif. (QAM Link is a federally registered trademark of Broadcom Corporation).

This implementation provides a fully automated way to configure a VDSL physical layer link for maximum throughput and/or margin, based on a minimum link margin, maximum BER, and overall target bit rates, as defined and input by a user. The algorithm is based on the procedures defined in the VDSL Coalition's ANSI and ETSI link initialization and rate adaptation draft specifications.

The algorithm may be configured to operate on the VTU-O (network) or VTU-R (customer premises) end of the VDSL link and implements the state machines, VDSL operations channel messaging and modem configuration switching defined in the ETSI and ANSI specifications. The algorithm has been optimized for use with the BCM6010 Scalable DSL Transceiver IC.

Source code is delivered under license from Broadcom and may be ported by the user to a controller of choice. 32 Kbytes of Program Memory and a 16-bit machine is recommended for execution.

The algorithm features:

fixed-rate or fixed-margin configuration;
variable baud, center frequency and constellation;
state-machine design for coordinated VTU-O, VTU-R operation;

VDSL operations channel in-band messaging;
independent configuration of upstream and downstream;
Reed-Solomon errors and SNR reporting mechanism; and VTU-O master, VTU-R slave operation VOC handshaking for reliable link message exchange maximizes throughput in presence of bridged taps and other impairments.

Figure 6:
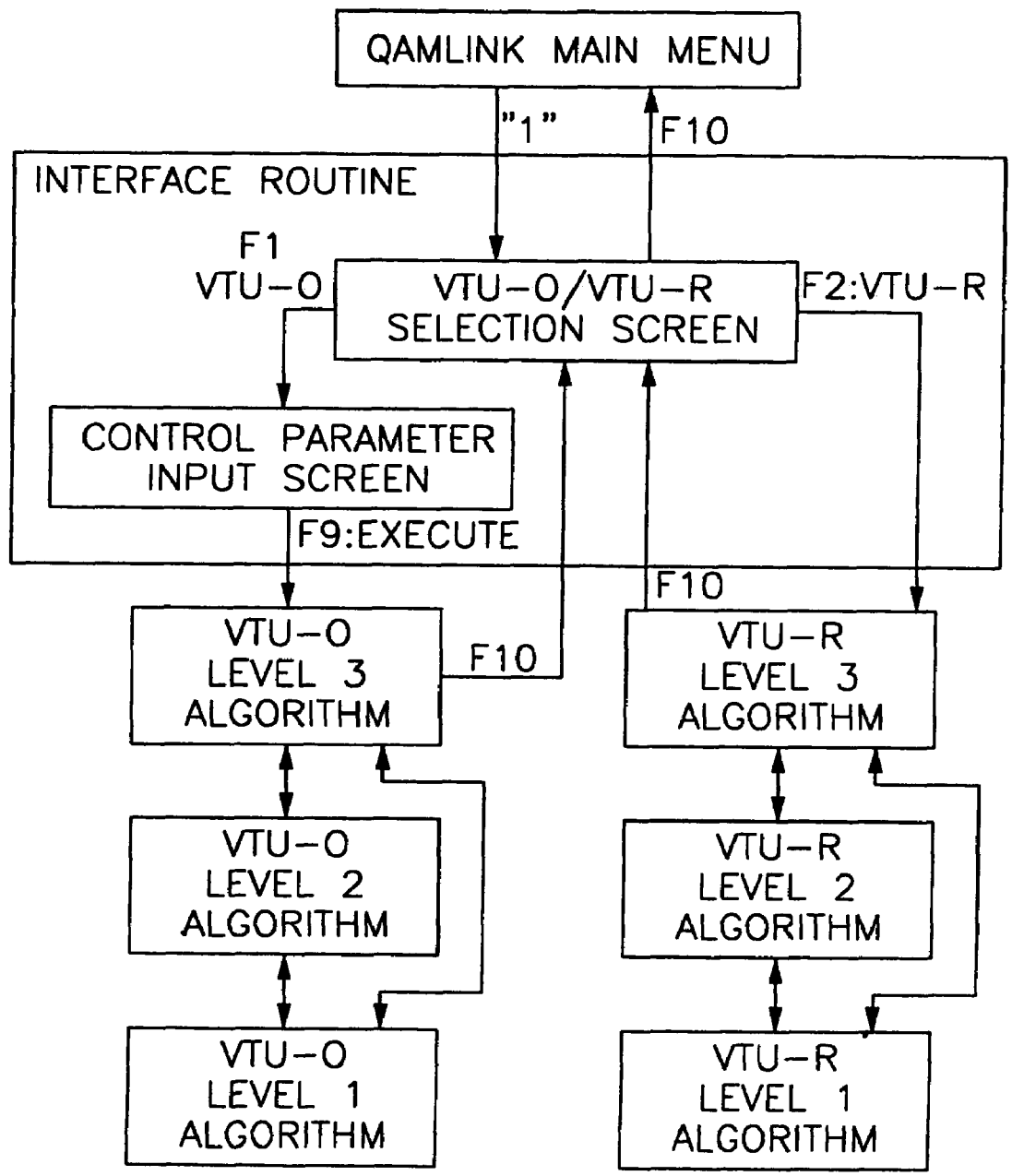
FIG. 6 is a block diagram showing VDSL VOC and rate adaptive initialization software.

The VDSL Operations Channel (VOC) and Rate-Adaptive Initialization code is run on a PC as a user-selectable option under QAMLink. FIG. 6 below shows a block diagram of the overall software structure. As shown there, from the main QAMLink window the user selects "1" to enter the VTU-O/VTU-R Selection Screen within an Interface Routine. From this screen the user selects either F1 or F2 to configure the system as a VTU-O (Central Office side transceiver) or VTU-R (remote CPE transceiver), respectively. For a VTU-O selection the user is directed to the Control Parameter Input screen, in which the user may override default values for upstream and downstream minimum margin, overall target rate, pre-FEC BER limits, symbol rates, and maximum constellation size. Because the VTU-R is a slave of the VTU-O, no comparable control selections exist for the VTU-R.

The software then enters either the VTU-O or VTU-R Level 3 algorithm, discussed below. After a short delay either system type will display a message to the screen indicating that typing a "C" (for "CONNECT") will start the automatic rate adaptive initialization. In this way the user is able to activate a link request from either the VTU-R or the VTU-O.

Typically a user will first execute this procedure for the VTU-O transceiver, followed by the VTU-R, and then activate an initialization request from one of the modems. The Level 1 through Level 3 algorithms for both VTU-O and VTU-R will then work together to execute the following sequence of steps. After acquiring initial default downstream (QPSK, 1.62 Mbaud) and upstream (QPSK, 540 kbaud) links, the VTU-O uses the VOC channel to first set the upstream constellation. It then establishes a series of downstream links at the specified set of additional spectral allocations. The downstream SNR achieved at each of these symbol rates is tabulated by the VTU-O. By evaluating the table of SNR vs. symbol rate values thus achieved, the VTU-O selects the symbol rate/constellation combination which maximizes bit rate up to the overall target rate and maximizes margin beyond that.

Following configuration of the downstream link with the final selected parameters, both VTU-O and VTU-R Level 3 algorithms display an indication of the final symbol rate, constellations, and bit rates selected. The VTU-O also records this and other intermediate data to a file on the PC. At this point the user can return to the main QAMLink menu at either modem by selecting F10. An automatic restart capability can then optionally be enabled under the QAM Constellation monitor. This functionality provides for a rapid return to the final selected link parameters following a sustained loss of synchronization.

The following set of downstream symbol rates are currently supported by the software: 1.62 Mbaud, 3.24 Mbaud, 3.70286 Mbaud, 4.05 Mbaud, 4.32 Mbaud, 4.86 Mbaud, 5.184 Mbaud, 5.67 Mbaud, and 6.48 Mbaud. For each of these the center frequency is selected so as to produce the same lower band edge (currently 1.4985 MHz). The set of downstream symbol rates tried by the VTU-O during any particular initialization attempt is a specific subset of these rates, as established in the Control Parameter Input screen. In a ported environment this allows the OAM&P platform to leverage existing information about the line to trade off rate granularity versus activation time.

Use of the overall target rate feature in the Control Parameter Input screen allows for implementation of the alternative initialization goal of maximizing margin at a specified bit rate.

VOC/Initialization Software Structure

The code which implements the functionality described above and illustrated in FIG. 6 consists of a set of C language routines compiled and linked with the base QAMLink code. Conceptually, the VOC/Initialization software implements three major algorithms plus an interface routine, which are structured in a hierarchical manner. The interface routine and each of the three algorithms are implemented by one or more C language routines. The interface routine provides the user with a connection between the main QAMLink menu and the rate adaptive algorithms. The specific details of the functions of each of the three algorithms depends on whether the transceiver is specified as a VTU-O or VTU-R, but at a high level the functionality of a given algorithm is similar for both modems.

At the top of the rate adaptive hierarchy is the Level 3 algorithm. The Level 3 algorithm provides high-level instructions to the lower levels of the hierarchy to be carried out. At the VTU-O the Level 3 algorithm is responsible for generating transmission parameter change requests and processing of the results of these changes. Hence it is the VTU-O Level 3 algorithm which directs the series of downstream symbol rate changes, builds the SNR table, and selects the final spectral allocation and constellation pair. At the VTU-R the Level 3 algorithm is responsible for monitoring the received VOC field, calling the Level 1 algorithm if a non-IDLE message is detected, and calling the Level 2 algorithm if a change in transmission parameter has been requested.

Figure 7:
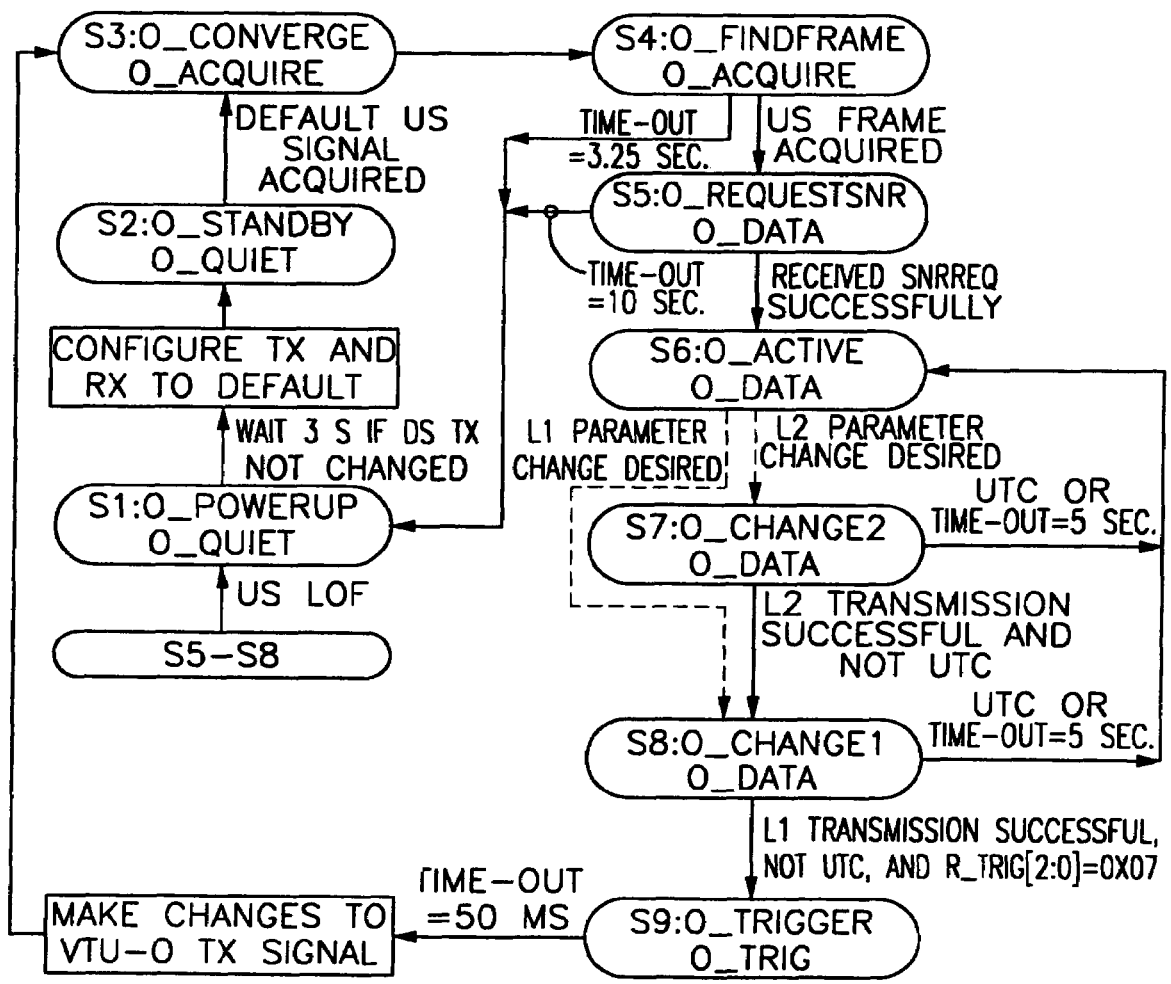
FIG. 7 is a flow chart showing VTU-O initialization and the adaptation state machine.
Figure 8:
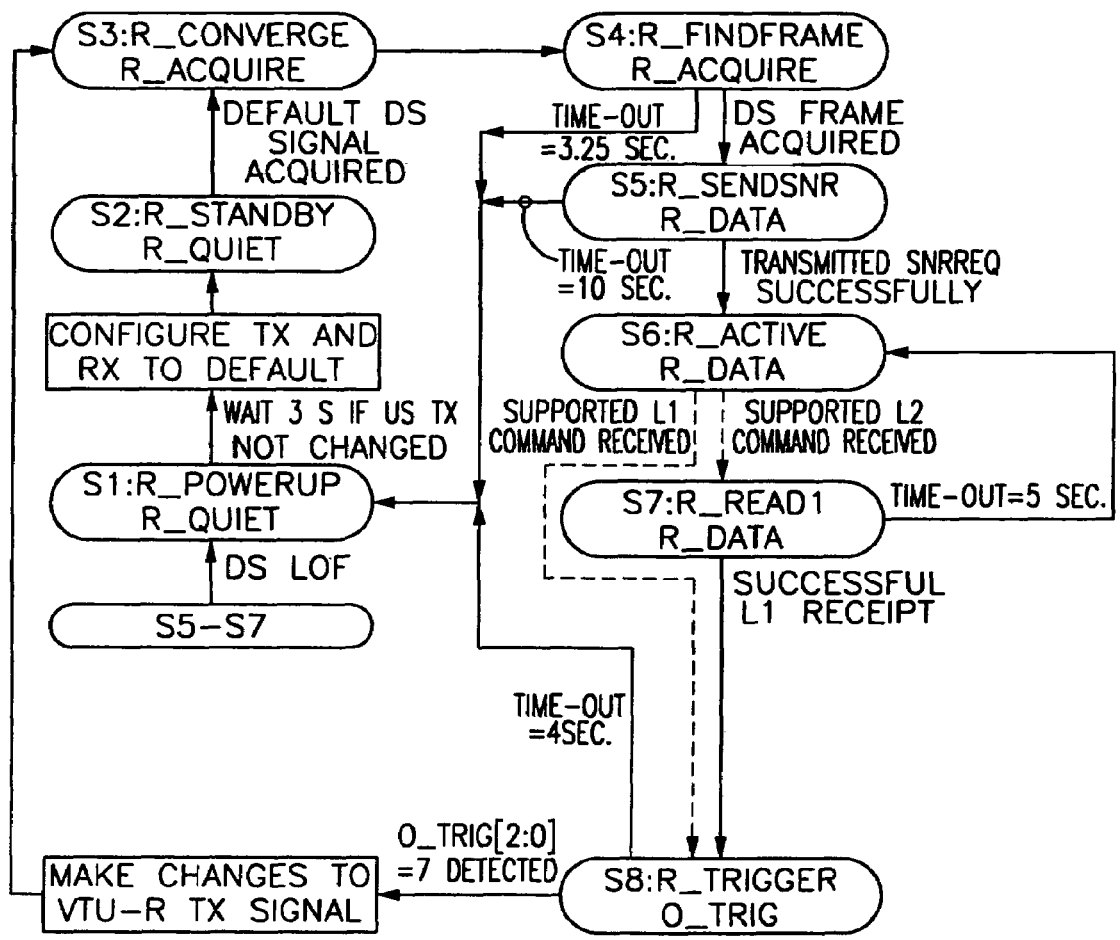
FIG. 8 is a flow chart showing VTU-R initialization and the rate adaptation state machine.

The Level 2 algorithm is responsible for implementing the initialization and adaptation state machines, shown in FIG. 7 and FIG. 8. At the VTU-O, the Level 3 algorithm calls the Level 2 algorithm to request that a change in transmission parameter, such as symbol rate, be executed. At the VTU-R, the Level 2 algorithm is called when the Level 3 algorithm learns (from data returned by its Level 1 algorithm) that the VTU-O has issued a parameter change request which the VTU-R supports. In addition, the Level 2 algorithms of both modems are invoked to establish the default system links.

Figure 9:
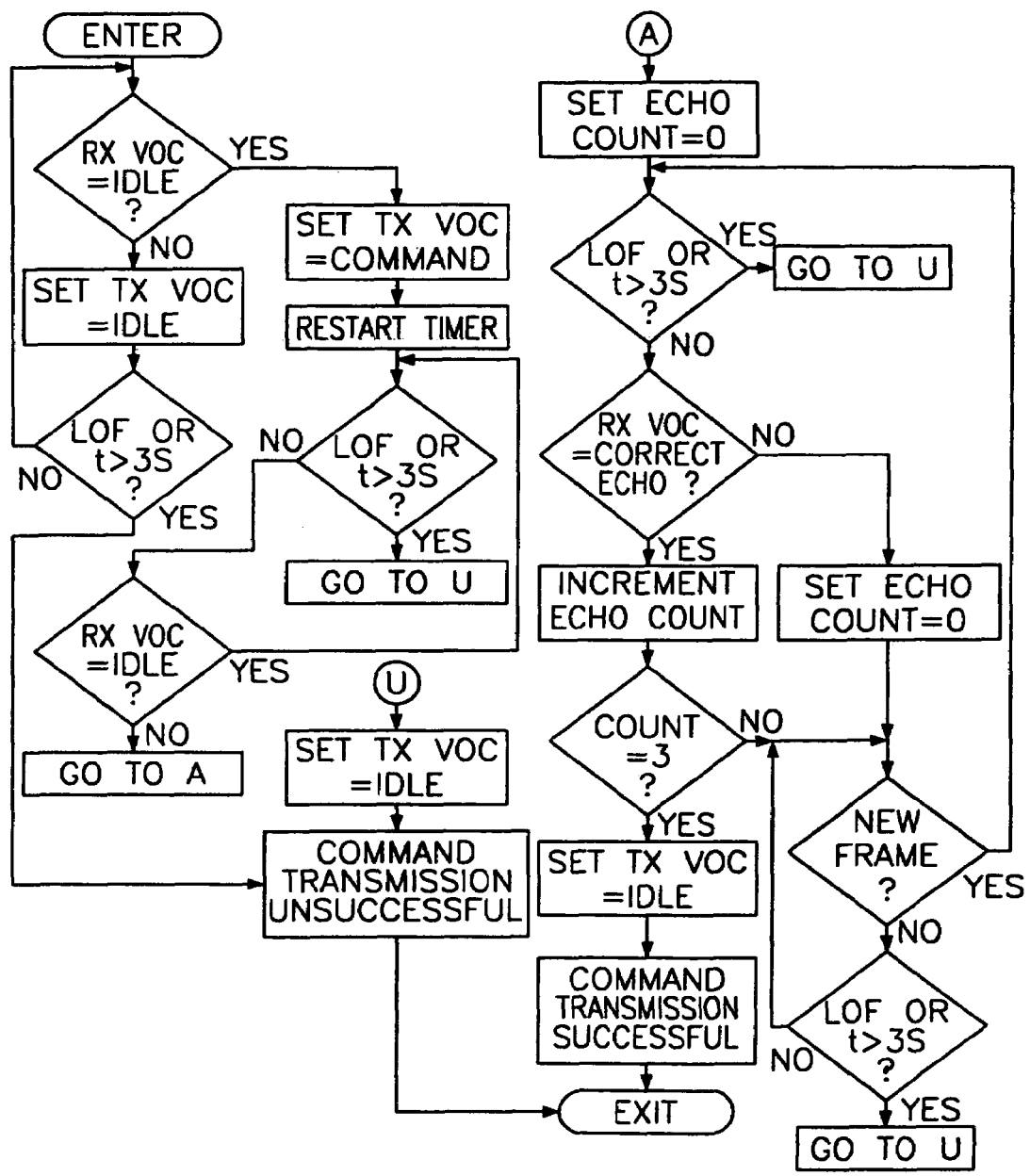
FIG. 9 is a flow chart showing VTU-O VOC handshaking.
Figure 10:
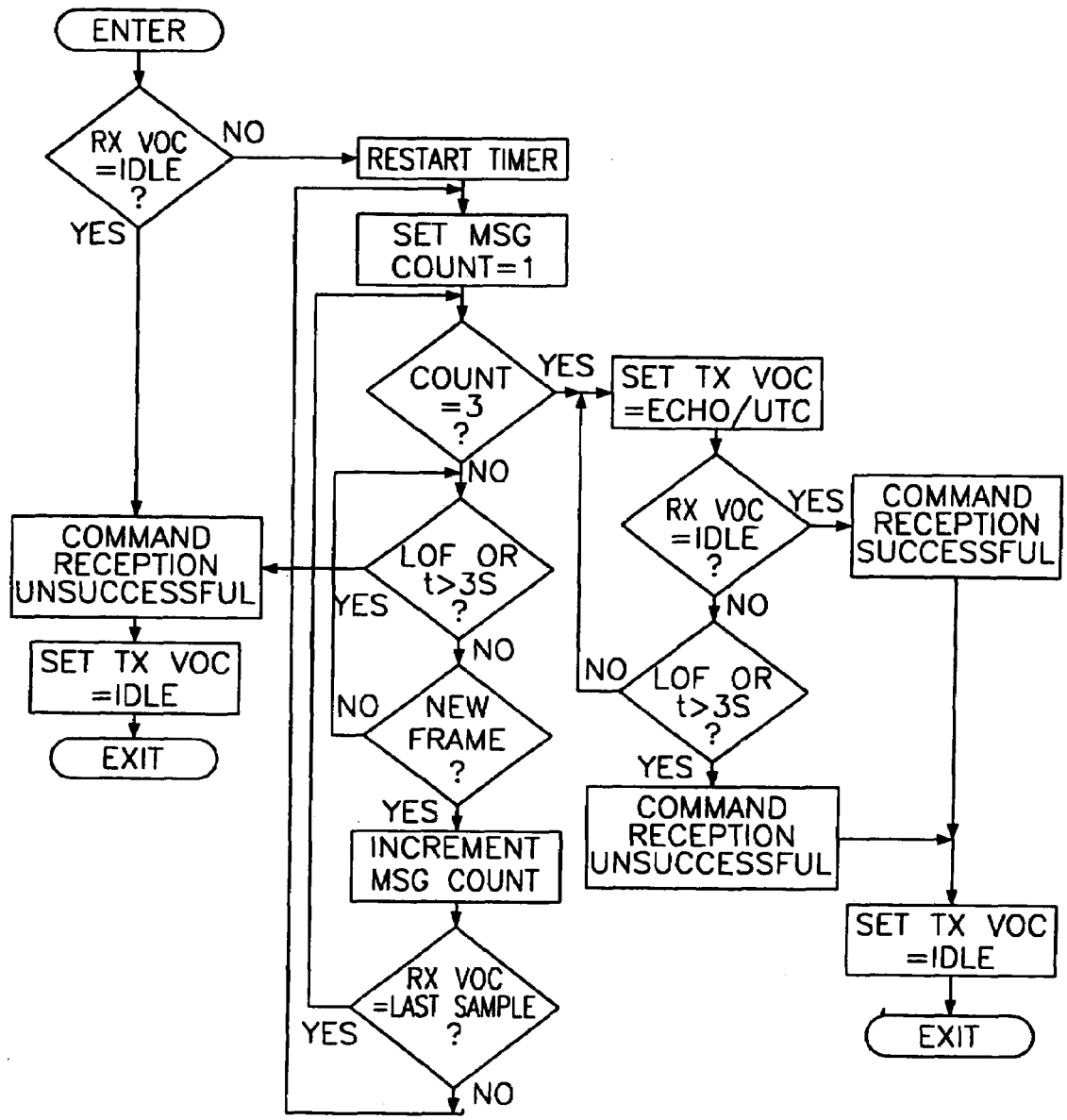
FIG. 10 is a flow chart showing VTR-R VOC handshaking.
Figure 11:
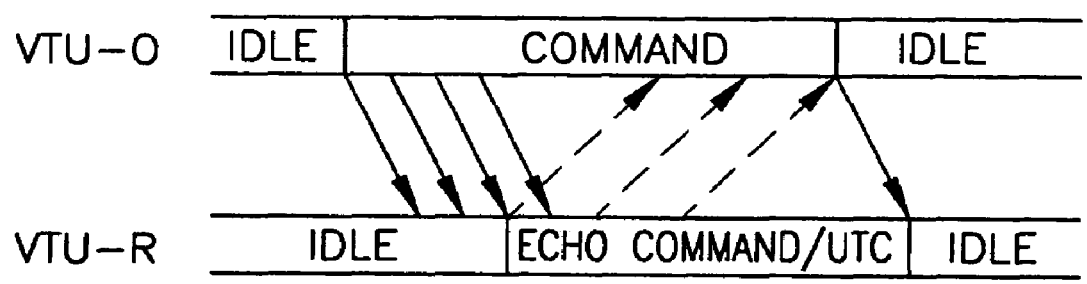
FIG. 11 is an example of a VOC handshake for a successfully communicated command.
Figure 12:
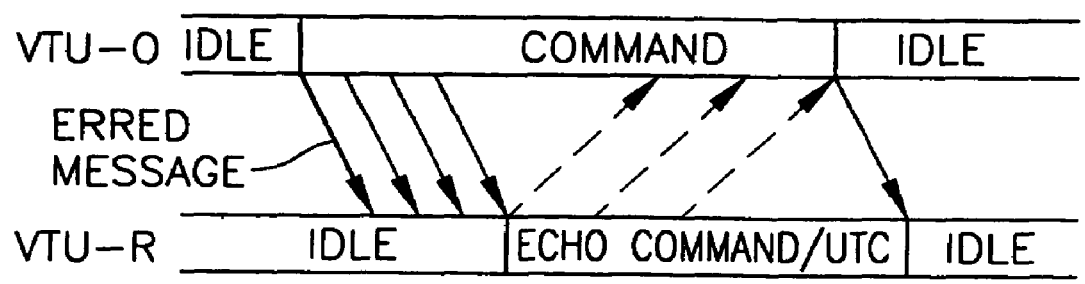
FIG. 12 is an example of a VOC handshake for a successfully communicated command despite the presence of a transmission error.

The Level 1 algorithm implements the VOC handshake flow charts, shown in FIG. 9 and FIG. 10. Two illustrative VOC message sequences, which could be produced by the concurrent operation of these two flow charts, are shown in FIG. 11 and FIG. 12. At the VTU-O, the Level 1 algorithm is called by either the Level 2 or Level 3 algorithm and provided with a COMMAND message that is to be communicated to the other end using the VOC, along with the expected ECHO from the VTU-R. At the VTU-R the Level 1 algorithm is called by either the Level 2 or Level 3 algorithm whenever a non-IDLE received VOC message is first detected. The VTU-R Level 1 algorithm is responsible for interpreting the received VOC COMMAND and generating the proper ECHO response.

VTU-O Level 1 Inputs and Outputs

Every time the VTU-O Level 1 algorithm is called it makes use of the following information:

the value of the three-octet VOC COMMAND (1 octet opcode plus 2 octets data) that the VTU-O Level 1 algorithm is to attempt communicating to the VTU-R;

an indication of whether the COMMAND is a READ or a WRITE; and the value of the expected VOC ECHO to be received from the VTU-R.

If the COMMAND is a WRITE, only the opcode portion of this expected ECHO is significant. If the COMMAND is a READ, both the opcode and data portion of the expected ECHO are significant.

Upon exiting the VTU-O Level 1 algorithm provides the following information:

whether the VOC message communication was deemed successful or not, as defined by the VTU-O handshake flow chart; and whether the received ECHO was the Unable To Comply (UTC) response or not.

This information is significant only if the message communication is considered successful.

The value of the two data octets received in the ECHO from the VTU-R. This information is significant only if: 1) The COMMAND was a READ; 2) The message communication was deemed successful; and 3) The received ECHO was not a UTC.

VTU-O Level 1 Functional Description

The VTU-O Level 1 algorithm implements the VTU-O VOC Handshaking Flow Chart shown in FIG. 9. This algorithm is called by the Level 2 or Level 3 algorithm whenever the VTU-O has a VOC command to send. Entering the flow chart at the ENTER position, the algorithm first waits for the received upstream VOC message to be IDLE, after which the downstream transmit VOC field is set equal to the VOC COMMAND to be transmitted. Functionality continues as shown in the flow chart until the "RX VOC=Correct Echo?" decision block is reached. The answer to this question depends on a variety of conditions, and is provided by the illustrative C code below.

Processing continues as shown in the flow chart until the "New Frame?" decision block is reached. Since QAMLink does not have access to the BCM6010 interrupt pins, this block can be implemented here by simply waiting for 2 ms (2 ms is guaranteed to be longer than the longest upstream frame period).

If the flow chart enters the "Command Transmission Successful" block, the Level 1 algorithm exits, returning an indication of a successful message communication and setting the UTC indicator and the value of the echoed data. If instead the flow chart enters any of the "Go To U" blocks, the algorithm exits and sets the unsuccessful message indication.

```
answer = 'Y';if (command_type = = read){ if(echo_count == 0)
    {      if((rx_voc_opcode != UTC) &&
    (rx_voc_opcode != expected_echo_opcode)) answer = 'N';
    last_rx_opcode = rx_voc_opcode;         last_rx_dat =
rx_voc_data;  }       else       if((rx_voc_opcode       !=
last_rx_opcode) || (rx_voc_data != last_rx_data))
    answer = 'N';}else{ if(echo_count == 0)      {
    if((rx_voc_opcode) != UTC) &&            ((rx_voc_opcode
!= expected_echo_opcode) ||        (rx_voc_data !=
expected_echo_data))) answer = 'N';   last_rx_opcode
= rx_voc_opcode;            last_rx_data = rx_voc_data; }
    else      if((rx_voc_opcode       !=    last_rx_opcode) ||
(rx_voc_data != last_rx_data))             answer = 'N';}
```

VTU-R Level 1 Inputs and Outputs

The VTU-R Level 1 algorithm does not make use of any external inputs. The reason for this is that the Level 1 algorithm is called from either the Level 2 or Level 3 algorithm as soon as a repeated non-IDLE message is detected on the received VOC. As such, the VTU-R does not yet reliably know what message is being received on the downstream VOC. This will be determined by the Level 1 algorithm.

Upon exiting the VTU-O Level 1 algorithm provides the following information:

whether the VOC message communication was deemed successful or not, as defined by the VTU-R handshake flow chart;

the value of the three octet received VOC message (this information is only significant if the message communication was deemed successful); and the value of the three-octet ECHO message which the Level 1 algorithm communicated during the handshake (this information is only significant if the message communication was deemed successful).

VTU-R Level 1 Handshaking Flow Chart

The VTU-R Level 1 algorithm implements the VTU-R VOC Handshaking Flow Chart shown in FIG. 10. This algorithm is called by the Level 2 or Level 3 algorithm whenever the VTU-R first detects receipt of a repeated non-IDLE COMMAND message from the VTU-O. It is the job of the VTU-R Level 1 algorithm to reliably determine what VOC message it is receiving, and to reply with the correct ECHO.

Entering the flow chart at the ENTER position, the algorithm first checks whether the received VOC is IDLE. If it is, the Level 1 algorithm returns and indicates an unsuccessful COMMAND communication. If not, the Level 1 algorithm stores both the opcode and data portion of this COMMAND as the variable last_command. Processing continues as shown in the flow chart until the "New Frame?" decision block is reached. Since QAMLink does not have access to the BCM6010 interrupt pins, this block can be implemented here by simply waiting for 1 ms (1 ms is guaranteed to be longer than the longest downstream frame period). After incrementing the message counter the "RX VOC=Last Sample?" decision block is reached. The answer to this question is Yes if the newest received VOC COMMAND sample exactly equals that stored in last_command (both opcode and data), and No otherwise. If the answer is No, the variable last_command is overwritten with the new received VOC COMMAND sample.

When the answer to the question posed by the "Count=3?" decision block is Yes, the same VOC COMMAND has been sampled three times in a row, and the Level 1 algorithm must reply with the correct ECHO. To determine the value of this ECHO the Level 1 algorithm calls an internal routine which provides it. This internal routine can provide the opcode portion of the echo from a simple table look-up. For a WRITE COMMAND the ECHO data is simply a copy of the WRITE COMMAND data, but for a READ COMMAND the routine will typically query one or more registers on the BCM6010, and perhaps perform further processing, in forming the data potion of the ECHO. A summary of this process is provided below. If the flow chart enters the "Command Transmission Successful" block, the Level 1 algorithm exits, providing an indication of a successful message communication. If instead the flow chart enters either of the "Command reception Unsuccessful" blocks, the algorithm exits and provides the unsuccessful message indication.

Generation of VTU-R VOC ECHO Opcode and Data Fields

FIG. 13 is a table which describes the opcode and data fields of the ECHO which the VTU-R Level 1 algorithm should respond with, as a function of the received COMMAND. The ECHO opcode is either the same as the COMMAND opcode, or UTC. The ECHO data is the same as the COMMAND data for a WRITE COMMAND, but for a READ COMMAND requires further processing. As shown in FIG. 13, the current version of the VOC/Initialization software supports 6 COMMANDs: D_NOM, D_CONST, U_CONST, SNRREQ, CORERREQ, and UCERREQ. Later software versions will support additional commands, presently under development by standards bodies.

Level 2 Algorithm, VTU-O, Inputs and Outputs

Every time the VTU-O Level 2 algorithm (as shown in FIG. 7) is called it makes use of the following information:

1) An indication as to whether the Level 2 algorithm is to enter the VTU-O Initialization and Adaptation state machine at either state S1, S7, or S8.

2) The value of two complete VOC COMMANDs, including opcode and data. If the algorithm is to enter at state S7, these two COMMANDs are those which the Level 2 algorithm is to attempt to communicate and implement prior to returning to state S6. In this case the first COMMAND is an L2 COMMAND and the second COMMAND is L1. L1 and L2 class commands are listed in Table 9. (Currently supported are all Class L1, meaning that state S7 is currently not being used.) If the algorithm is entered at state S8, only the L1 COMMAND is to be communicated and implemented, and hence only the L1 COMMAND is significant. If the algorithm is to enter at state S1, neither of the two COMMANDs is significant.

3) The VTU-O Level 2 algorithm contains a link fail counter which records the number of times that the algorithm, during the present call, is forced into state S1 from any of the other states. (This does not include an initial entry into the algorithm by way of state S1.) The Level 2 algorithm exits if this counter reaches a value of 10, or upon entry to state S6, whichever occurs first. Both Level 2 and Level 3 algorithms are exited if the default link cannot be established within 30 seconds of the initiation of downstream transmission.

Upon exiting the VTU-O Level 2 algorithm provides the following information:

1) Whether communication of the VOC COMMAND(s) was successfully accomplished with an ECHO other than UTC or, alternatively, whether communication was aborted prior to successful completion due to the state machine following the UTC/time-out path from either state S7 or S8 to state S6. This information is only significant if the Level 2 algorithm was directed to start at states S7 or S8, not at S1. If entering at state S7, the indication of successful communication is to mean that both of the VOC messages were successful.

2) Whether either of the received ECHOs was the Unable To Comply (UTC) response. This information is significant only if the Level 2 algorithm was entered at states S7 or S8, and the UTC/time-out path from states S7 or S8 to S6 was followed.

3) The value of the link fail counter. A value of zero, when interpreted properly with the other input and output argument values, indicates that the requested parameter change (if entering at states S7 or S8) or the acquisition with the default parameters (if entering at state S1) was completed successfully. A returned value between 2 and 9 indicates that the requested parameter change or initial default acquisition failed, and that the default link has been subsequently established. Finally, a returned value of 10 indicates that the requested parameter change or initial default acquisition failed, as did repeated attempts to establish the default links.

4) The value of the data received from the VTU-R in the SNRREQ COMMAND during state S5. This information is significant only if the Level 2 algorithm exits due to a transition from state S5 to state S6.

VTU-O Level 2 Overview

The VTU-O Level 2 algorithm implements the VTU-O Initialization and Adaptation State Machine shown in FIG. 7. This algorithm is called by the Level 3 algorithm whenever the VTU-O desires either a change in transmission parameter or system acquisition using the default link parameters.

Algorithm Entry at State S1

State S1: O_POWERUP

For an execution of the algorithm starting at state S1, the link fail counter is first reset to zero. Next, the VTU-O configures its transmitter and receiver with the default link parameter values. If configuring the transmitter in this way modifies the downstream transmit signal symbol rate, center frequency, and/or constellation, the VTU-O then transitions immediately to state S2. Otherwise, the VTU-O first waits for three seconds before moving to state S2. Because the VTU-O may renew non-zero transmission soon after entering state S2, the wait period for the latter case is necessary to insure that the VTU-R is forced into state S1 as well.

State S2: O_STANDBY

Figure 14:
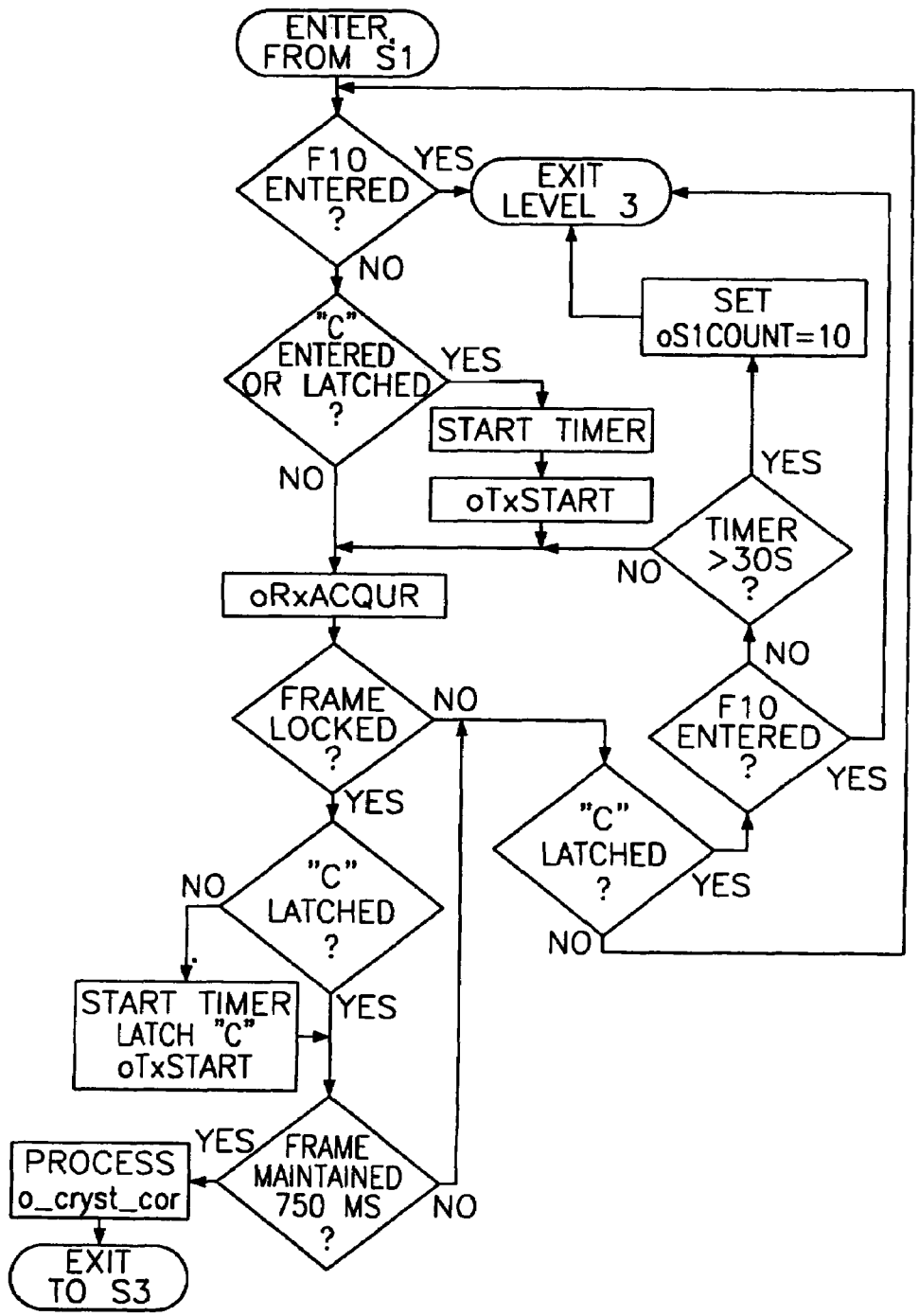
FIG. 14 is a flow chart showing the VTU-O level 2 algorithm processing during state S2.

VTU-O processing during this state is described through the flowchart of FIG. 14. The block "oTxStart" initiates downstream transmission, while "oRxAcqur" attempts acquisition of the default upstream link. Processing of the block labeled "Process o_cryst_cor" corrects for crystal frequency offset between the VTU-O and VTU-R.

State S3: O_CONVERGE

Upon arriving in state S3 if the system is responding to transmission of a U_CONST command, then the VTU-O switches the upstream receiver constellation. Alternatively, if S3 is entered from state S1, the frame loss and re-lock criteria are increased for steady state operation. Following this the VTU-O proceeds to state S4.

State S4: O_FINDFRAME

In state S4 the VTU-O polls the frame lock status bit to determine if its receiver has acquired the upstream frame. If the VTU-O has acquired frame within 3.25 seconds of entering this state, the state machine then evaluates the entry state and the recent COMMAND opcode. If the Level 2 algorithm started at state S8 and the COMMAND opcode was either US_CONST or D_NOM, then the state machine delays for 100 ms, unfreezes the VTU-O receiver, and transitions to state S5. If this condition is not met the state machine transitions directly to state S5.

While searching for the upstream frame, if the state timer has exceeded 1.0 seconds, and if the default link or a new upstream constellation is being acquired, then acquisition is re-attempted repeatedly, until either the frame is found or the state timer reaches 2 seconds. If the state timer reaches 3.25 seconds then the VTU-O link fail counter is incremented. In this case if the counter equals 10, the Level 2 algorithm exits. If not, control passes to state S1.

State S5: O_REQUESTSNR

In state S5 the VTU-O attempts communication of the SNRREQ VOC message. It does this by forming the corresponding COMMAND, expected ECHO, and other information needed by the VTU-O Level 1 algorithm, and calling that routine. If the Level 1 algorithm returns with an indication of either an unsuccessful command communication or with UTC for an ECHO, then the VTU-O is to perform repeated SNR request communication attempts until one of them works, or the state timer reaches 10 seconds, whichever occurs first. Following each return of the Level 1 algorithm, the Level 2 algorithm checks that received frame is still acquired. If state time-out, or a loss of received frame that lasts 200 ms occurs, the link fail counter is incremented and the state machine either exits (counter=10) or transitions to state S1 (counter<10). Alternatively, if a successful non-UTC SNR request communication occurs, the state machine transitions to state S6.

State S6: O_ACTIVE

Upon entering state S6 the VTU-O Level 2 algorithm exits and provides the information indicated above.

Transmission Parameters and Nominal (Symbol Rate, Center Frequency) Pairs.

The transmission parameters which can be modified in the BCM6010 through the rate adaptive software are illustrated in the table of FIG. 15. As shown there, the software can program the upstream and downstream values of the following parameters: symbol rate, constellation, interleaving depth, transmit PSD level, center frequency, and frame structure type. Of particular importance are the variables u_nom and d_nom, which take on values from the VOC command data fields of U_NOM and D_NOM, respectively, shown in the tables of FIGS. 16 and 17. The value of u_nom and d_nom indicate which of the nominal upstream and downstream symbol rate and center frequency pairs are being requested by the U_NOM or D_NOM command.

For this version of the rate adaptive software, the values for all parameters shown in the table of FIG. 13 other than upstream and downstream constellations and d_nom are hard coded into the software. Real-time modification of the other parameters shown will be enabled following suitable standardization.

Algorithm Entry at States S7 or S8

States S7: O_CHANGE2 and S8: O_CHANGE1

The VTU-O Level 2 algorithm is called with a starting point indicator of states S7 or S8 whenever the Level 3 algorithm desires a change in transmission parameter. The VTU-O then initiates transmission of one or both of the VOC COMMANDs generated by the Level 3 algorithm. When the Level 2 algorithm is started at state S7, both COMMANDs are to be communicated to the VTU-R. If the Level 2 algorithm is started at state S8, only the L1 COMMAND is to be communicated.

While in either state S7 or S8, the VTU-O attempts to communicate the corresponding VOC COMMAND to the VTU-R by forming the necessary data for the Level 1 algorithm and calling it, repeatedly if necessary, until a successful non-UTC transmission occurs. However, if communication of either COMMAND is still unsuccessful or UTC after 5 seconds of trying, the state machine returns to state S6 as shown in FIG. 7. In this case the Level 2 algorithm exits, providing the information described above.

For the state machine in state S7, if the first COMMAND argument is transmitted successfully with an ECHO opcode other than UTC before the 5 second time-out, the state machine transitions to state S8, where transmission of the second COMMAND argument is attempted. The Level 2 algorithm also attempts communication of the second COMMAND while in state S8 if execution of the Level 2 algorithm started in State 8. Either way, if communication of this second COMMAND is successful, and the returned ECHO is not UTC, then the VTU-O Level 2 algorithm begins polling the R_TRIG bit fields in the downstream uncoded control channel for the trigger indication. Once this is detected the state machine moves to state S9.

While in states S7 and S8 the VTU-O monitors the upstream received frame status. If loss of frame is maintained for 200 ms the link fail counter is incremented, and the state machine either exits (counter=10) or transitions to state S1 (counter<10).

State S9: O_TRIGGER

Upon entering state S9 the Level 2 algorithm prepares the VTU-O receiver according to the VOC COMMAND just recently communicated, transmits the signal O_TRIG, and then waits 50 ms. Following this, the VTU-O makes any necessary changes to its downstream transmitter.

VTU-R Level 2 Inputs and Outputs

Every time the VTU-R Level 2 algorithm is called it makes use of the following information:

1) An indication as to whether the Level 2 algorithm is to enter the VTU-R Initialization and Adaptation state machine at either state S1, S7, or S8. (The Level 2 algorithm will be entered via state S7 if the VTU-R Level 3 algorithm learns from its Level 1 algorithm that a supported L2 COMMAND request has just been received from the VTU-O. The Level 2 algorithm will be entered via state S8 if the VTU-R Level 3 algorithm learns from its Level 1 algorithm that a supported L1 COMMAND request has just been received from the VTU-O. The Level 2 algorithm will be entered via state S1 if the VTU-R Level 3 algorithm wishes to initialize the system using the default link parameters.)

2) The value of two complete VOC COMMANDs, including opcode and data. The first COMMAND is an L2 COMMAND and the second COMMAND is L1. The L2 COMMAND is the same L2 COMMAND which the VTU-R has just successfully received from the VTU-O (if the Level 2 algorithm was just entered via state S7). Hence, the L2 COMMAND argument is only significant if the VTU-R Level 2 algorithm is entered at state S7. The L1 COMMAND is either the same L1 COMMAND which the VTU-R has just successfully received from the VTU-O (resulting in the Level 2 algorithm being entered at state S8), or is the L1 COMMAND corresponding to the L2 COMMAND just received from the VTU-O (entry at state S7). In the latter case the L1 COMMAND data is not significant. Finally, neither COMMAND argument is significant if the Level 2 algorithm is entered at state S1.

The VTU-R Level 2 algorithm contains a link fail counter which records the number of times that the algorithm, during the present call, is forced into state S1 from any of the other states. (This does not include an initial entry into the algorithm by way of state S1.) The Level 2 algorithm exits if this counter reaches a value of 10, or upon entry to state S6, whichever occurs first. Both Level 2 and Level 3 algorithms are exited if the default link cannot be established within 30 seconds of the initiation of upstream transmission. Upon exiting the VTU-R Level 2 algorithm provides the following information:

1) An indication as to whether state S6 was ever reached, and if so whether it was entered from state S5 or from state S7.

2) The value of the link fail counter. A value of zero, along with an indication that state S6 was entered from S5, indicates that the requested parameter change (if entering at states S7 or S8) or the acquisition with default parameters (if entering at state S1) was completed successfully. A value between 2 and 9 indicates that the requested parameter change or initial default acquisition failed, and that the default link has been subsequently established. Finally, a returned value of 10 indicates that the requested parameter change or initial default acquisition failed, as did repeated attempts to establish the default link.

VTU-R Level 2 Functional Description

Overview

The VTU-R Level 2 algorithm implements the VTU-R Initialization and Adaptation State Machine shown in FIG. 8. This algorithm is called by the VTU-R Level 3 algorithm whenever it has learned from the Level 1 algorithm that a supported transmission parameter change has been requested by the VTU-O. This algorithm is also called whenever the VTU-R Level 3 algorithm desires link initialization using the default parameters.

Algorithm Entry at State S1

State S1: R_POWERUP

For an execution of the algorithm starting at state S1, the link fail counter is first reset to zero. Next the VTU-R configures its transmitter and receiver with the default parameter values by executing the default configuration commands. If this step modifies the upstream transmit signal constellation, the VTU-R then transitions immediately to state S2. Otherwise, the VTU-R first waits for three seconds before moving to state S2. Because the VTU-R may renew non-zero transmission soon after entering state S2, the wait period for the latter case is necessary to insure that the VTU-O is forced into state S1 as well.

State S2: R_STANDBY

Figure 18:
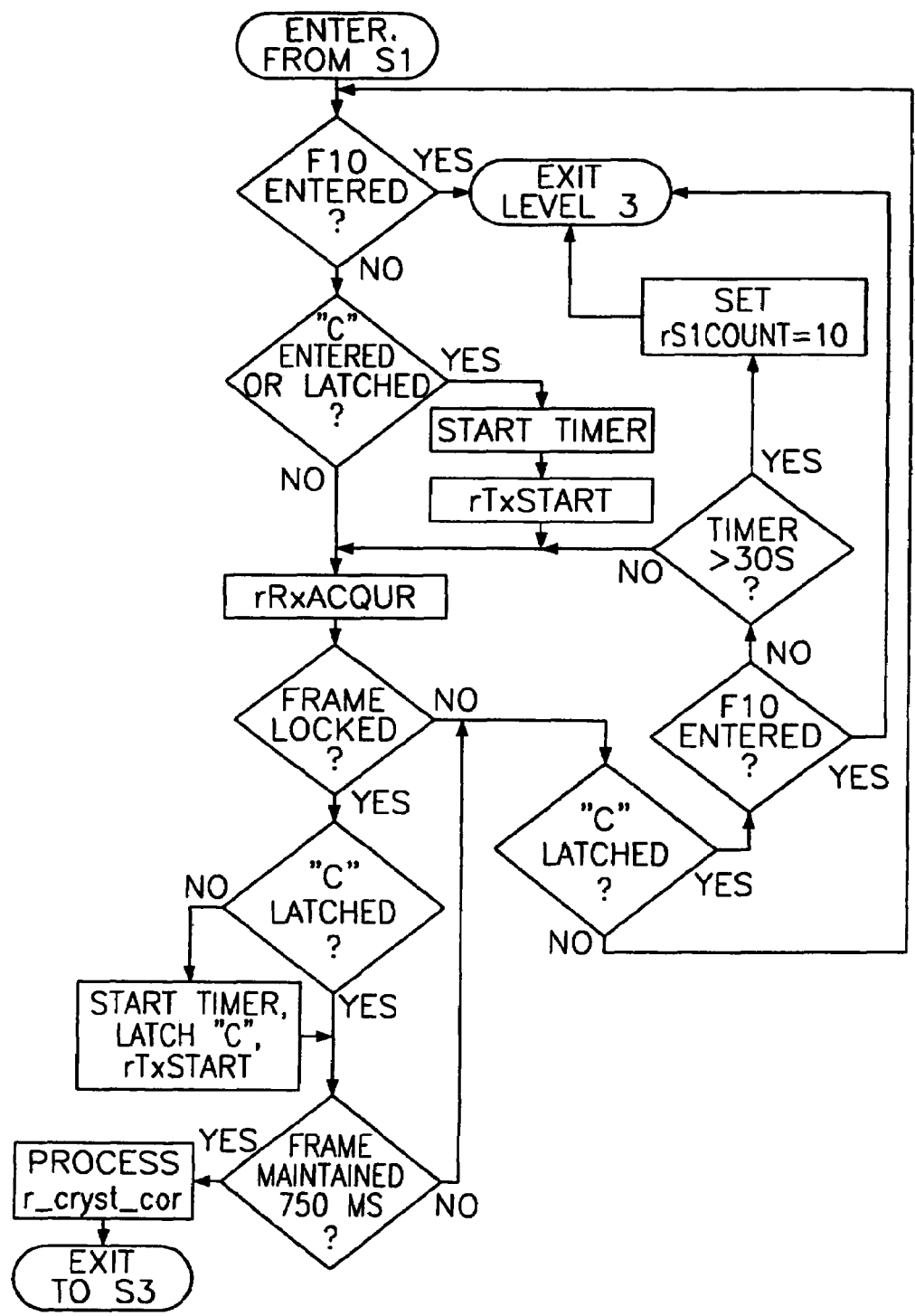
FIG. 18 is a flow chart showing the VTU-R level 2 algorithm processing during state S2.

VTU-O processing during this state is described through the flowchart of FIG. 18. The block "rTxStart" initiates upstream transmission, while "rRxAcqur" attempts acquisition of the default downstream link. Processing of the block labeled "Process r_cryst_cor" corrects for crystal frequency offset between the VTU-O and VTU-R.

State S3: R_CONVERGE

Upon arriving in state S3 the VTU-R waits for the VTU-O to finish any changes to its transmit signal, then makes any corresponding changes to its own receiver. The VTU-R then proceeds to state S4.

State S4: R_FINDFRAME

In state S4 the VTU-R polls the frame lock status bit to determine if its receiver has acquired the downstream frame. If the VTU-R has acquired frame within 3.25 s of entering state S4, the state machine then evaluates the entry state and COMMAND opcode arguments passed to this call of the Level 2 algorithm. If a downstream constellation change just occurred the VTU-R unfreezes its receiver. Either way the state machine then transitions to state S5.

If frame is still not acquired after the state S4 timer reaches 1 second, then acquisition is re-attempted repeatedly, until either the frame is found or the state timer reaches 3.25 seconds. If frame has not been found within 3.25 seconds of entering state S4, then the link fail counter is incremented. In this case, if the counter is less than 10, control passes to state S1. If the counter is equal to 10, the Level 2 algorithm exits.

State S5: R_SENDSNR

In state S5 the VTU-R alternately polls the received frame lock indicator, the received VOC frame field, and a timer which tracks the total amount of time spent in state S5. As long as the received VOC opcode is anything other than SNRREQ, frame is in lock, and the timer has not yet reached 10 seconds, then the Level 2 algorithm continues this simple polling. However, if loss of frame is detected and maintained for 500 ms, or if the timer reaches 10 seconds, then the Level 2 algorithm increments the link fail counter and either transitions to state S1 (counter<10) or exits (counter=10). On the other hand, if the received VOC opcode SNRREQ is detected first, the Level 2 algorithm remains in state S5 and calls the VTU-R Level 1 algorithm in order to reliably read and respond to the received VOC message.

When the Level 1 algorithm returns, the VTU-R checks the value of the returned ECHO. If the returned ECHO opcode is not SNRREQ, then the Level 2 algorithm ignores the received COMMAND and returns to polling frame lock, the received VOC frame field, and the S5 timer, as in the previous paragraph. However, if the returned opcode is SNRREQ, then the Level 2 algorithm transitions to state S6.

State S6: R_ACTIVE

Upon entering state S6 the VTU-O Level 2 algorithm exits and provides the information indicated above.

Algorithm Entry at States S7 or S8

State S7: R_READ1

The VTU-R Level 2 algorithm is entered via state S7 whenever the VTU-R successfully receives a supported L2 COMMAND. In this case the Level 2 algorithm L2 COMMAND data contains this newly received COMMAND, and the L1 COMMAND data contains the next COMMAND that the VTU-O is expected to send. As a result, while residing in state S7 the Level 2 algorithm performs the following operations.

The VTU-R starts by repetitively polling the frame lock indicator, the received VOC opcode, and a state timer. If the timer reaches 5 seconds before state S7 is exited, the state machine moves to state S6 and the Level 2 algorithm returns. If loss of frame is detected and maintained for 500 ms, the state machine increments the link fail counter and enters either state S1 (counter<10) or exits (counter=10). And if a received VOC opcode other than IDLE is detected, the Level 2 algorithm remains in state S7 and calls the VTU-R Level 1 algorithm.

When the Level 1 algorithm returns, the received VOC COMMAND that it returns is compared to the Level 2 algorithm L1 COMMAND data. If the two opcodes are the same, the state machine transitions to state S8. If the two opcodes are not the same, the Level 2 algorithm resumes polling frame lock, the received VOC field, and the state timer, as in the above paragraph.

State S8: R_TRIGGER

State S8 can be entered either directly at the beginning of the Level 2 algorithm call, or from state S7. If entered at the beginning of the call, the link fail counter is reset. Then if the D_CONST L1 command has just been communicated, the VTU-R freezes its receiver in preparation for the downstream constellation change. Following this, the VTU-R begins transmitting R_TRIG and polling the O_TRIG bits and a state S8 timer. When O_TRIG is detected, the Level 2 algorithm changes the receiver constellation (only if D_CONST is the newest command), resets r_trig[2:0], and changes the transmitter constellation (only if U_CONST is the newest command), before transitioning to state S3. However, if the S8 timer reaches 4 seconds before O_TRIG is detected, the Level 2 algorithm then increments the link fail counter and instead either moves to state S1 (counter<10) or exits (counter=10).

VTU-O Level 3 Algorithm

Inputs and Outputs

Every time the VTU-O Level 3 algorithm is called it is provided with the following information:

1) The upstream and downstream channel minimum margins.

2) The upstream and downstream channel overall target bit rates.

3) A limit on the upstream and downstream pre-FEC BERs.

4) The maximum downstream constellation size to use.

5) The subset of the downstream symbol rates above 1.62 Mbaud which is to be used.

Upon return the VTU-O Level 3 algorithm provides all final and intermediate data on symbol rates, constellations, measured SNRs, and pre-FEC BERs.

VTU-O Level 3 Functional Description

Overview

The VTU-O Level 3 algorithm works by issuing a series of calls to the VTU-O Level 1 and Level 2 algorithms and intelligently processing the results. The overall goal is to determine and utilize transmission parameters that independently maximize the upstream and downstream line rates, subject to the constraints provided by the variables mentioned above. (Notice that the target bit rate variables can be used to produce an activation sequence which instead maximizes channel margin for a specified bit rate.) A flowchart which summarizes the VTU-O Level 3 algorithm is shown in FIG. 19.

Figure 19:
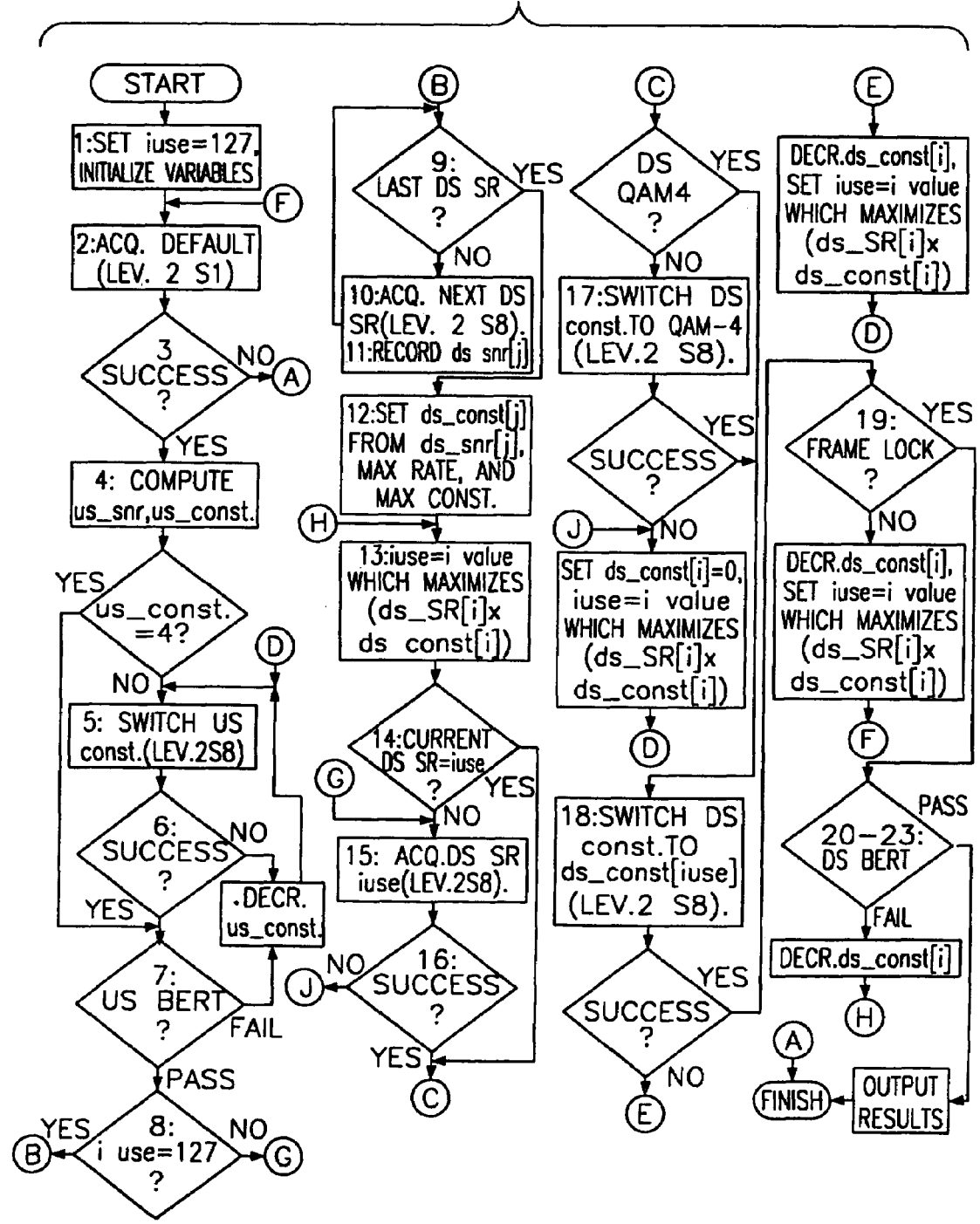
FIG. 19 is a flow chart showing the VTU-O level 3 algorithm.

In FIG. 19, US refers to upstream, DS refers to DS, BERT refers to bit error rate (BER) test, and SR refers to symbol rate. The integers i and j point to individual downstream symbol rates. The integer iuse indicates the current tentative selection for final downstream symbol rate, and will ultimately take on one of the legitimate values for i. iuse=127 is a dummy value used to indicate that a tentative selection for iuse has not yet been made.

The process starts by establishing the default upstream and downstream links, defined here as QPSK with symbol rates and center frequencies given by D_NOM data value 0x0081 and U_NOM data value 0x0003. The Level 3 algorithm then reads the upstream SNR and uses this and the selected upstream margin to select an upstream constellation, as shown in the table of FIG. 20. The overall target upstream bit rate may enforce a reduced constellation selection at this point. Next the upstream pre-FEC BER is calculated, and if greater than the maximum level, successively smaller upstream constellations are tried until this pre-FEC BER target is met.

With the upstream channel thus established, the Level 3 algorithm then configures the downstream. It accomplishes this by stepping the downstream symbol rate from its initial 1.62 Mbaud to each of the higher symbol rates selected by the user. The complete list of such symbol rates, which can be augmented if needed in later software releases, is: 3.24 Mbaud, 3.70286 Mbaud, 4.05 Mbaud, 4.32 Mbaud, 4.86 Mbaud, 5.184 Mbaud, 5.67 Mbaud, and 6.48 Mbaud. The Level 3 algorithm requests a downstream QPSK acquisition at each of the selected symbol rates, and uses the returned downstream SNR estimate and requested downstream margin to make a preliminary constellation selection for each symbol rate, as per the table of FIG. 21. The overall target downstream bit rate and maximum constellation selections may enforce reduced constellation sizes for one or more symbol rates at this point.

Based on this information, the Level 3 algorithm determines the downstream (spectral allocation, constellation) pair that maximizes the downstream bit rate. In the event of a maximizing rate tie, the combination with the highest SNR margin is selected. The downstream channel is then configured to the selected symbol rate and constellation, and the pre-FEC BER measured. If this is greater than the selected target, the constellation associated with the current symbol rate is decremented, the search for the maximizing combination is performed anew, and the process repeats. Once a selected combination is found that passes the pre-FEC BER test, that combination is declared to be the final selected downstream parameters. As described in this way, the algorithm maximizes bit rate for channels which cannot achieve the overall target bit rate, (subject to minimum margin and maximum BER constraints), and delivers the overall target bit rate for all other channels, and in a manner which maximizes margin. This is done for both upstream and downstream channels.

At this point the Level 3 algorithm outputs the information provided below, showing the selected upstream and downstream symbol rates and constellations, and the SNR and any measured pre-FEC BERs associated with intermediate symbol rates. This information is also written to the screen, but for the selected symbol rates only. At this point entering F10 causes the VTU-O Level 3 algorithm to exit, allowing for link monitoring or other operations via separate QAMLink elements. The auto-restart functionality, described in Section 4, is frequently invoked at this point.

Parameters Returned to User
Upstream Results—Selected Parameters
540 kbaud: Const.; QPSK SNR; RS Sym Errors
Downstream Results—Selected Parameters
Downstream Symbol Rate Mbaud: Const; QPSK SNR; RS Sym Errors
Downstream Intermediate Results
1.62 Mbaud: Const; QPSK SNR; RS Sym Errors
3.24 Mbaud: Const; QPSK SNR; RS Sym Errors
3.70286 Mbaud: Const; QPSK SNR; RS Sym Errors
4.05 Mbaud: Const; QPSK SNR; RS Sym Errors
4.32 Mbaud: Const; QPSK SNR; RS Sym Errors
4.86 Mbaud: Const; QPSK SNR; RS Sym Errors
5.184 Mbaud Const.; QPSK SNR; RS Sym Errors
5.67 Mbaud: Const; QPSK SNR; RS Sym Errors
6.48 Mbaud: Const; QPSK SNR; RS Sym Errors Notice that the returned results of an initial call to the Level 3 algorithm may be used to modify the controlling inputs in subsequent calls. For example, a user desiring perfectly symmetrical rates (i.e., upstream bit rate=downstream bit rate) can trigger an initial activation with upstream and downstream target rates set equal. (If the maximum achievable rate is desired, the targets would be set to an unachievably high value, thereby allowing the algorithm to find the highest achievable rate without interference from the target rate limit.) Following the return of the initial activation, a subsequent activation is then triggered, but for this example with the upstream and downstream overall target bit rates set equal to the minimum of the two returned rates.

VTU-R Level 3
Inputs and Outputs

As a slave of the VTU-O, the VTU-R Level 3 algorithm does not require access to its own set of process control parameters. Upon return, information regarding the final transmission parameters are available by querying BCM6010 hardware registers.

VTU-R Level 3 Functional Description
Overview

Figure 22:
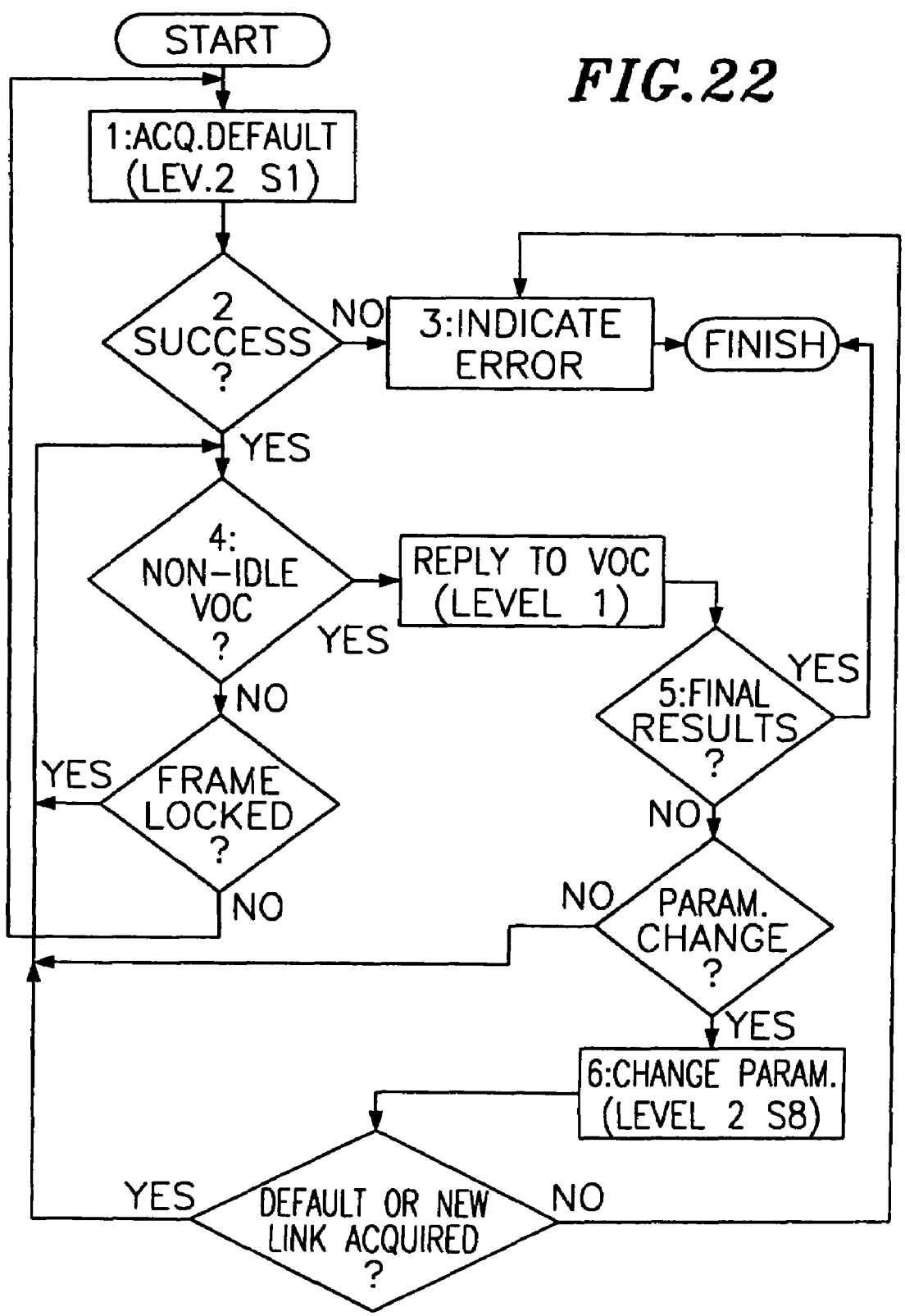
FIG. 22 is a flow chart showing the VTU-R level 3 algorithm.

Because the VTU-R is a slave of the VTU-O, the VTU-R Level 3 algorithm processing is relatively simple. The flowchart is shown in FIG. 22. Upon entry the Level 3 algorithm prepares for the establishment of the default links by calling the Level 2 algorithm with an entry state of S1. After the default link is established, the Level 3 algorithm polls the received VOC frame field, the received frame lock indicator, and the keyboard. If the function key F10 is entered, the Level 3 algorithm returns. If a loss of frame is sustained for 500 ms, an attempt is made to re-establish the default link by once again calling Level 2 with an entry state of S1. And if a non-IDLE VOC message is repeated the Level 1 algorithm is called in order to interpret and respond to the message.

In the latter case, if the ECHO sent by the Level 1 algorithm indicates a request for a supported transmission parameter change, then the Level 3 algorithm calls the Level 2 algorithm in order to implement that change. Following the Level 2 algorithm return, the Level 3 algorithm resumes polling the received VOC, received frame lock indicator, and keyboard, as before.

Auto-Restart Functionality

An automatic restart ("warm start") functionality is built into the rate adaptive software. Accessible following the completion of any rate adaptive startup, this functionality provides for rapid reacquisition of the final rate adaptive transmission parameters in the event of a sustained loss of upstream or downstream frame. In the current version of software, a loss of frame must be maintained for 3-4 seconds before an automatic restart is initiated. This allows time for the receiver to recover on its own (i.e., without undergoing the restart procedure) from a long impulse noise event or micro-interruption of the signal.

An automatic restart begins with the system bringing up the default links, followed by the use of the VOC message channel to switch directly to the final transmission parameters. In the event that the final parameters cannot be re-established in this way, the system reverts to a full rate adaptive startup ("cold start"). This can occur when there is a significant change in channel characteristics since the last cold start.

When enabled, the automatic restart functionality also places the transceiver in a mode which provides maximum tolerance to burst noise.

The auto-restart functionality is enabled through the QAM constellation monitor of QAMLink (F8 from the QAMLink main menu). Once in the constellation monitor, the auto-restart mode can be toggled on and off through the F7 key. Auto-restart mode returns to off whenever the constellation monitor is exited. Auto-restart must be enabled in both the VTU-O and VTU-R in order for the described functionality to execute.

FIG. 23 is a table showing the IDLE and UTC messages, FIG. 24 is a table of the performance monitoring and control VOC messages, and FIG. 25 is a table of the messages used to trigger PMD parameter changes.

It is understood that the exemplary method and apparatus for rate adaptation in DSL and the like described herein and shown in the drawings represents only a particular embodiment of the invention. Indeed, various modifications and additions may be made to such embodiment without departing from the spirit and scope of the invention.

For example, the present invention may be utilized to optimize quadrature amplitude modulation (QAM) transmission performance by maximizing bit rate subject to a specified minimum margin constraint, by maximizing bit rate subject to a specified maximum bit error rate (BER) constraint, by maximizing margin at a specified bit rate, or by minimizing bit error rate (BER) at a specified bit rate. Indeed, quadrature amplitude modulation (QAM), may be optimized by combining any such techniques so as to provide a specified target bit rate, above which margin is maximized.

Such optimization may apply independently to both the upstream and downstream channels in a full duplex quadrature amplitude modulation (QAM) system.

Either the same or different optimization criteria, such as those listed above, may be performed for the upstream and downstream channels, in a full duplex quadrature amplitude modulation (QAM) system.

Optionally, the downstream data payload rate may be reduced so as to more nearly equal the data payload rate achieved by the upstream channel, in which the reduction is performed by reducing the transport payload percentage and/or the downstream line rate, in a way which is consistent with the selected optimization criteria. Alternatively, the upstream payload rate may be reduced so as to more nearly equal the payload rate achieved by the downstream channel, in which the reduction is performed by reducing the transport payload percentage and/or the upstream line rate, in a way which is consistent with the selected optimization criteria.

Quadrature amplitude modulation (QAM) transmission performance optimization may be performed according to the selected optimization criteria listed above, by varying in discrete steps one or more of the following parameters: Symbol rate, constellation, center frequency, transmit power and power spectral density, physical frame structure, block coding parameters, convolutional coding parameters, trellis coding modulation parameters, Tomlinson precoder coefficients, and interleaving parameters.

Thus, the present invention relates to an algorithm which establishes or attempts to establish a series of links at a predetermined set of symbol rate and center frequency pairs, in which the achieved signal to noise ratio (SNR) and/or bit error rate (BER) for each symbol rate and center frequency pair is tabulated and used to select a final symbol rate, center frequency and constellation triplet, according to the specified optimization criteria.

Each of the different symbol rate and center frequency links may be initially established using a specific constellation corresponding to that symbol rate and center frequency pair, in which the measured signal to noise ratio (SNR) for that link is used to tabulate a new constellation to be associated with that symbol rate and center frequency. This new constellation is to be used in subsequent instances in which that symbol rate and center frequency pair is selected for further intermediate or final use by the algorithm which implements the specified optimization criteria. The new constellation associated with a specific symbol rate and center frequency pair can be modified according to the results of the signal to noise ratio (SNR) or bit error rate (BER) measurements made upon the link with both the new and modified constellations.

Quadrature amplitude modulation (QAM) transmission performance optimization may be accomplished utilizing the above criteria, by varying in a continuous or nearly continuous fashion one or more of the following parameters: symbol rate, constellation, center frequency, transmit power and power spectral density, FEC parameters, and Tomlinson precoder coefficients. Optimization may be performed either when a link is first activated, subsequently re-activated, or at any desired time or periodically. Thus, optimization may be performed intermittently and on an ongoing basis while a link is in operation. Indeed, such optimization may be performed continuously on an ongoing basis when a link is in operation.

Recovery mechanisms which cause a link or sequence of links with certain predefined parameters to be established in the event of a link failure caused by an attempted change in parameter, may be utilized. Sequences of links may utilize certain predetermined parameters which are established in the event of a link failure caused by any source other than an attempted change in parameter. The predefined parameters of the links are automatically established and may be the same as or different from those of the previously existing link. A shared or dedicated channel may be used for communication of parameter modification negotiation messages.

The present invention encompasses the robust detection of the presence or absence of a receive signal with certain predefined parameters, and the potential presence of noise or interference which is possibly stronger in magnitude than that of the desired received signal, by utilizing repeated attempts at blind signal acquisition, and through determination of successful or unsuccessful acquisition following each attempt. Acquisition success or failure is determined by evaluating some combination of signal to noise ratio (SNR), frame synchronization (or lack thereof), block codeword synchronization (or lack thereof), and bit error rate (BER), against a generally acceptable threshold.

A change may be made to the transmission parameters of a link in which the receiving transceiver, following reception of the parameter change message, delays assertion of the signal change trigger indication until it has readied the receiver for the subsequent signal change and which, following such assertion, it delays attempted acquisition of the new signal parameters until enough time has passed that the received signal parameter is guaranteed to have changed. The bit error rate (BER) may be measured both before and after forward error correction (FEC), based on a counting of the number of codeword symbols corrected by a block, e.g., Reed-Solomon decoder, and also a counting of the number of code words containing errors which can be detected, but not corrected.

An exemplary procedure for rapidly changing the constellation of a link, while the link remains operational, may involve freezing the receiver equalizer and automatic gain control prior to changing the constellation grid sliced at the receiver. This is followed by changing the constellation used in the transmit signal, followed by re-initialization of the receiver symbol and carrier recovery loops and ending with unfreezing of the receiver equalizer.

An alternative exemplary procedure for rapidly changing the constellation of a link, while the link remains operational, may involve freezing the receiver equalizer and automatic gain control, followed by changing the constellation used in the transmit signal. The procedure is next followed by changing the constellation grid sliced at the receiver, followed by re-initialization of the receiver symbol and carrier recovery loops prior to unfreezing of the receiver equalizer.

Rapid changing to a more dense link constellation while the link remains operational may be provided by freezing a portion of the receiver, followed by a gradual reduction in transmit power until the old (existing) transmit constellation points lie on the minimum power portion of the new transmit constellation grid. This is followed by switching of the receiver constellation slicing grid from the old constellation to the new constellation and concurrently modifying the receiver overall gain, so that the presently received (old) constellation points lie on the minimum power portion of the new received constellation. Concurrently, a possible change in the freeze/unfreeze status of a portion of the receiver, followed by a change in transmit constellation from the old constellation to the new constellation and concurrently a change in transmit signal power so that the minimum power constellation points do not have their magnitude changed by this transmit constellation change step.

An exemplary procedure for rapidly changing to a less dense link constellation may similarly be achieved while the link remains operational. This involves a possible freezing of a portion of the receiver, followed by a switching of the transmitted constellation from the old constellation to the new constellation, and concurrently a change in transmit signal power so that the new transmit constellation points lie on the minimum power portion of the old constellation points, followed by a switching of the receiver constellation slicing a grid from the old constellation to the new constellation, and concurrently a modification to the receiver overall gain, so that the presently received constellation points lie on the new constellation grid, followed by a possible change in the receiver overall gain and the freeze/unfreeze status of a portion of the receiver, followed by a possible change in transmit signal power level.

The above descriptions of exemplary embodiments of transmission rate adaptation systems and methods have been made for exemplary purposes. Because of variations which will be apparent to those having skill in the art, the present invention is not intended to be limited to the particular embodiments described above. Such variations and other modifications and alterations are included within the scope and intent of the invention as described in the appended claims.

What is claimed is:

1. A method for data communication over a transmission channel, comprising:
   (a) evaluating, by a communications transceiver, a channel response characteristic with respect to a constellation size and a single carrier having an adjustable center frequency of a transmission signal;
   (b) varying, by the communications transceiver, the adjustable center frequency of the transmission signal;
   (c) determining, by the communications transceiver, a maximum spectral allocation for the transmission channel for which a signal-to-noise ratio is less than a predetermined value;
   (d) re-evaluating, by the communications transceiver, the channel response characteristic with respect to the varied center frequency; and
   (e) determining, by the communications transceiver, an optimal constellation size and optimal center frequency responsive to at least one of an optimum bit rate and an optimum noise margin.

2. The method of claim 1, wherein step (b) comprises:
   (b)(i) varying a stop frequency of a spectral allocation of the transmission signal while maintaining a substantially constant start frequency of the spectral allocation.

3. The method of claim 1, wherein the transmission channel is a single QAM channel.

4. The method of claim 1, further comprising:
   (f) varying the constellation size by encoding a signal in conformance with a plurality of discrete constellation sizes and determining a maximum constellation size at which a single QAM communication occurs without exceeding a predetermined bit error rate.

5. The method of claim 4, wherein step (f) comprises:
   (f)(i) varying the constellation size while maintaining a substantially constant spectral allocation; and repeating the constellation size varying step at a plurality of different discrete spectral allocations.

6. The method of claim 1, wherein step (b) comprises:
   (b)(i) varying the spectral allocation while maintaining a constant constellation size; and
   (b)(ii) repeating the center frequency varying step for a plurality of different discrete constellation sizes.

7. A method for enhancing a potential channel response characteristic of a transmission channel, comprising:
   (a) varying, by a communications transceiver, a center frequency and a constellation size of the transmission channel;
   (b) determining, by the communications transceiver, the potential channel response characteristic associated with the center frequency and the constellation size; and
   (c) defining, by the communications transceiver, a combination of the center frequency and the constellation size at which the potential channel response characteristic is enhanced.

8. The method of claim 7, wherein step (a) comprises:
   (a)(i) varying a start frequency and a stop frequency thereof.

9. The method of claim 8, wherein step (a)(i) comprises:
   (a)(i)(A) varying the start frequency and the stop frequency in discrete increments.

10. The method of claim 8, wherein step (a)(i) comprises:
    (a)(i)(A) sweeping the start frequency and the stop frequency in a continuous manner.

11. The method of claim 7, wherein the channel performs quadrature amplitude modulated (QAM) communication.

12. The method of claim 7, wherein step (c) comprises:
(c)(i) defining the combination of the center frequency and the constellation size at which a bit rate is enhanced.

13. The method of claim 7, wherein step (c) comprises:
(c)(i) defining the combination of the center frequency and the constellation size at which a margin at which quadrature amplitude modulated (QAM) communication is performed is enhanced.

14. The method of claim 7, wherein step (a) comprises:
(a)(i) utilizing a plurality of different constellation sizes so as to determine a maximum constellation size at which communication occurs.

15. The method of claim 7, wherein step (a) comprises:
(a)(i) utilizing a plurality of different constellation sizes so as to determine a maximum constellation size at which communication occurs without exceeding a predetermined bit error rate (BER).

16. The method of claim 7, wherein step (a) comprises:
(a)(i) varying the constellation size while maintaining a constant center frequency and repeating this step for a plurality of different center frequencies.

17. The method of claim 7, wherein step (a) comprises:
(a)(i) varying the center frequency while maintaining a constant constellation size for a plurality of different constellation sizes.

18. A system for data communication over a transmission channel, comprising:
means for evaluating a channel response characteristic with respect to a constellation size and a single carrier having an adjustable center frequency of a transmission signal;
means for varying the adjustable center frequency of the transmission signal;
means for determining a maximum spectral allocation for the transmission channel for which a signal-to-noise ratio is less than a predetermined value;
means for re-evaluating the channel response characteristic with respect to the varied center frequency; and
means for determining an optimal constellation size and an optimal center frequency responsive to at least one of an optimum bit rate and an optimum noise margin.

19. The system of claim 18, wherein means for varying the adjustable center frequency comprises:
means for varying a stop frequency of spectral allocation of the transmission signal while maintaining a substantially constant start frequency of the spectral allocation.

20. The system of claim 18, further comprising:
means for varying the constellation size by encoding a signal in conformance with a plurality of discrete constellation sizes; and
means for determining a maximum constellation size at which a single QAM communication occurs without exceeding a predetermined bit error rate.

21. The system of claim 20, wherein the means for varying the constellation size comprises:
means for varying the constellation size while maintaining a substantially constant spectral allocation; and
means for repeating the varying of the constellation size at a plurality of different discrete spectral allocations.

22. The system of claim 18, means for varying the adjustable center frequency of the transmission signal comprises:
means for varying the spectral allocation while maintaining a constant constellation size; and
means for repeating the center frequency varying step for a plurality of different discrete constellation sizes.

23. A system for enhancing a potential channel response characteristic of a transmission channel, comprising:
means for varying a center frequency and a constellation size of the transmission channel;
means for determining the potential channel response characteristic associated with the center frequency and the constellation size; and
means for defining a combination of the center frequency and the constellation size at which the channel response characteristic is enhanced.

24. The system of claim 23, wherein the means for varying the center frequency and constellation size comprises:
means for varying a start frequency and a stop frequency thereof.

25. The system of claim 24, wherein the means for varying the center frequency and constellation size comprises:
means for varying the start frequency and the stop frequency in discrete increments.

26. The system of claim 24, wherein the means for varying the center frequency and the constellation size comprises:
means for sweeping the start frequency and the stop frequency in a continuous manner.

27. The system of claim 23, wherein the channel performs quadrature amplitude modulated (QAM) communication.

28. The system of claim 23, wherein the means for defining the combination of the center frequency and the constellation size comprises:
means for defining the combination of the center frequency and the constellation size at which a bit rate is enhanced.

29. The system of claim 23, wherein the means for defining the combination of the center frequency and the constellation size comprises:
means for defining the combination of the center frequency and the constellation size at which a margin at which quadrature amplitude modulated (QAM) communication is performed is enhanced.

30. The system of claim 23, wherein the means for varying the center frequency and the constellation size comprises:
means for utilizing a plurality of different constellation sizes so as to determine a maximum constellation size at which communication occurs.

31. The system of claim 23, wherein the means for varying the center frequency and the constellation size comprises:
means for utilizing a plurality of different constellation sizes so as to determine a maximum constellation size at which communication occurs without exceeding a predetermined bit error rate (BER).

32. The system of claim 23, wherein the means for varying the center frequency and the constellation size comprises:
means for varying the constellation size while maintaining a constant center frequency and repeating this step for a plurality of different center frequencies.

33. The system of claim 23, wherein the means for varying the center frequency and the constellation size comprises:
means for varying the center frequency while maintaining a constant constellation size for a plurality of different constellation sizes.

* * * * *

UNITED STATES PATENT AND TRADEMARK OFFICE
CERTIFICATE OF CORRECTION

PATENT NO.        : 7,609,757 B2                                              Page 1 of 1
APPLICATION NO.   : 11/080100
DATED             : October 27, 2009
INVENTOR(S)       : David Jones It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1158 days.

Signed and Sealed this

Fourteenth Day of December, 2010

David J. Kappos
*Director of the United States Patent and Trademark Office*